(12) United States Patent
Chen et al.

(10) Patent No.: US 9,239,751 B1
(45) Date of Patent: Jan. 19, 2016

(54) COMPRESSING DATA FROM MULTIPLE READS FOR ERROR CONTROL MANAGEMENT IN MEMORY SYSTEMS

(71) Applicants: Xiaoheng Chen, San Jose, CA (US); Ying Yu Tai, Mountain View, CA (US); Jiangli Zhu, Sunnyvale, CA (US); Seungjune Jeon, Milpitas, CA (US)

(72) Inventors: Xiaoheng Chen, San Jose, CA (US); Ying Yu Tai, Mountain View, CA (US); Jiangli Zhu, Sunnyvale, CA (US); Seungjune Jeon, Milpitas, CA (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 134 days.

(21) Appl. No.: 13/831,686

(22) Filed: Mar. 15, 2013

Related U.S. Application Data

(60) Provisional application No. 61/746,551, filed on Dec. 27, 2012.

(51) Int. Cl.
*G11C 29/00* (2006.01)
*G06F 11/08* (2006.01)

(52) U.S. Cl.
CPC .................................. *G06F 11/085* (2013.01)

(58) Field of Classification Search
CPC ............ G06F 11/1076; G06F 11/1008; G06F 11/1068; G06F 11/1044; H05K 999/99
USPC .......................................................... 714/763
See application file for complete search history.

(56) References Cited

U.S. PATENT DOCUMENTS

| | | | |
|---|---|---|---|
| 4,173,737 A | 11/1979 | Skerlos et al. | |
| 4,888,750 A | 12/1989 | Kryder et al. | |
| 4,916,652 A | 4/1990 | Schwarz et al. | |
| 5,129,089 A | 7/1992 | Nielsen | |
| 5,270,979 A | 12/1993 | Harari et al. | |

(Continued)

FOREIGN PATENT DOCUMENTS

| EP | 1 299 800 | 4/2003 |
|---|---|---|
| EP | 1465203 A1 | 10/2004 |

(Continued)

OTHER PUBLICATIONS

Canim, Buffered Bloom ilters on Solid State Storage, ADMS*10, Singapore, Sep. 13-17, 2010, 8 pgs.

(Continued)

*Primary Examiner* — Esaw Abraham
*Assistant Examiner* — Enam Ahmed
(74) *Attorney, Agent, or Firm* — Morgan, Lewis & Bockius LLP

(57) ABSTRACT

The various implementations described herein include systems, methods and/or devices that may enhance the reliability with which data can be stored in and read from a memory. Some implementations include a method of compressing a sequence of read data values into a bit-tuple of a predefined length to enable soft information decoding systems that use less power and/or less memory. In some implementations, the bit-tuple of a predefined length is produced using M single-bit buffer locations, where M corresponds to the predefined length of the bit-tuple. Some implementations utilize a collection of characterization vectors that include soft information values associated with the possible permutations of the bit-tuples. In turn, a sequence of bit-tuples is converted into a sequence of soft information values by retrieving a particular characterization vector, and selecting a respective soft information value from that characterization vector for each bit-tuple in the sequence.

28 Claims, 13 Drawing Sheets

(56) References Cited

U.S. PATENT DOCUMENTS

| | | |
|---|---|---|
| 5,329,491 A | 7/1994 | Brown et al. |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,936,884 A | 8/1999 | Hasbun et al. |
| 5,943,692 A | 8/1999 | Marberg et al. |
| 5,982,664 A | 11/1999 | Watanabe |
| 6,000,006 A | 12/1999 | Bruce et al. |
| 6,006,345 A * | 12/1999 | Berry, Jr. ................... 714/718 |
| 6,016,560 A | 1/2000 | Wada et al. |
| 6,018,304 A | 1/2000 | Bessios |
| 6,070,074 A | 5/2000 | Perahia et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,295,592 B1 | 9/2001 | Jeddeloh |
| 6,311,263 B1 | 10/2001 | Barlow et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,678,788 B1 | 1/2004 | O'Connell |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,871,257 B2 | 3/2005 | Conley et al. |
| 6,895,464 B2 | 5/2005 | Chow et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader |
| 7,111,293 B1 | 9/2006 | Hersh et al. |
| 7,126,873 B2 | 10/2006 | See et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,328,377 B1 | 2/2008 | Lewis et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 * | 7/2010 | Passint ................... 714/763 |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,312,349 B2 | 11/2012 | Reche et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,885,434 B2 | 11/2014 | Kumar |
| 8,898,373 B1 | 11/2014 | Kang et al. |
| 8,910,030 B2 * | 12/2014 | Goel ...................... 714/763 |
| 8,923,066 B1 | 12/2014 | Subramanian et al. |
| 2001/0050824 A1 * | 12/2001 | Buch ..................... 360/48 |
| 2002/0024846 A1 | 2/2002 | Kawahara et al. |
| 2002/0083299 A1 | 6/2002 | Van Huben et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0114587 A1 | 5/2005 | Chou et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0085671 A1 | 4/2006 | Majni et al. |
| 2006/0087893 A1 | 4/2006 | Nishihara et al. |
| 2006/0107181 A1 | 5/2006 | Dave et al. |
| 2006/0136570 A1 | 6/2006 | Pandya |
| 2006/0136681 A1 | 6/2006 | Jain et al. |

(56) References Cited

U.S. PATENT DOCUMENTS

| | | |
|---|---|---|
| 2006/0156177 A1 | 7/2006 | Kottapalli et al. |
| 2006/0195650 A1 | 8/2006 | Su et al. |
| 2006/0244049 A1 | 11/2006 | Yaoi et al. |
| 2006/0259528 A1 | 11/2006 | Dussud et al. |
| 2006/0291301 A1 | 12/2006 | Ziegelmayer |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0201274 A1 | 8/2007 | Yu et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0028275 A1* | 1/2008 | Chen et al. .................... 714/752 |
| 2008/0043871 A1* | 2/2008 | Latouche et al. ............. 375/261 |
| 2008/0052446 A1 | 2/2008 | Lasser et al. |
| 2008/0056005 A1 | 3/2008 | Aritome |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2009/0003058 A1 | 1/2009 | Kang |
| 2009/0019216 A1 | 1/2009 | Yamada et al. |
| 2009/0037652 A1 | 2/2009 | Yu et al. |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0207660 A1 | 8/2009 | Hwang et al. |
| 2009/0222708 A1 | 9/2009 | Yamaga |
| 2009/0228761 A1 | 9/2009 | Perlmutter et al. |
| 2009/0249160 A1 | 10/2009 | Gao et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0199125 A1 | 8/2010 | Reche |
| 2010/0199138 A1 | 8/2010 | Rho |
| 2010/0202196 A1 | 8/2010 | Lee et al. |
| 2010/0208521 A1 | 8/2010 | Kim et al. |
| 2010/0262889 A1 | 10/2010 | Bains |
| 2010/0281207 A1 | 11/2010 | Miller et al. |
| 2010/0281342 A1 | 11/2010 | Chang et al. |
| 2011/0051513 A1 | 3/2011 | Shen et al. |
| 2011/0066597 A1 | 3/2011 | Mashtizadeh et al. |
| 2011/0078407 A1 | 3/2011 | Lewis |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0228601 A1 | 9/2011 | Olbrich et al. |
| 2011/0231600 A1 | 9/2011 | Tanaka et al. |
| 2011/0271040 A1 | 11/2011 | Kamizono |
| 2012/0023144 A1 | 1/2012 | Rub |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0185750 A1 | 7/2012 | Hayami |
| 2012/0195126 A1 | 8/2012 | Roohparvar |
| 2012/0203951 A1 | 8/2012 | Wood et al. |
| 2012/0216079 A1 | 8/2012 | Fai et al. |
| 2012/0233391 A1* | 9/2012 | Frost et al. .................... 711/103 |
| 2012/0236658 A1 | 9/2012 | Byom et al. |
| 2012/0239858 A1 | 9/2012 | Melik-Martirosian |
| 2012/0239976 A1 | 9/2012 | Cometti et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284587 A1 | 11/2012 | Yu et al. |
| 2013/0007073 A1 | 1/2013 | Varma |
| 2013/0007543 A1 | 1/2013 | Goss et al. |
| 2013/0024735 A1 | 1/2013 | Chung et al. |
| 2013/0031438 A1* | 1/2013 | Hu et al. ....................... 714/752 |
| 2013/0036418 A1 | 2/2013 | Yadappanavar et al. |
| 2013/0047045 A1 | 2/2013 | Hu et al. |
| 2013/0073924 A1 | 3/2013 | D'Abreu et al. |
| 2013/0086131 A1 | 4/2013 | Hunt et al. |

(56) References Cited

U.S. PATENT DOCUMENTS

| | | |
|---|---|---|
| 2013/0086132 A1 | 4/2013 | Hunt et al. |
| 2013/0094288 A1 | 4/2013 | Patapoutian et al. |
| 2013/0111279 A1 | 5/2013 | Jeon et al. |
| 2013/0111298 A1 | 5/2013 | Seroff et al. |
| 2013/0121084 A1 | 5/2013 | Jeon et al. |
| 2013/0124888 A1 | 5/2013 | Tanaka et al. |
| 2013/0128666 A1 | 5/2013 | Avila et al. |
| 2013/0132652 A1 | 5/2013 | Wood et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194874 A1 | 8/2013 | Mu et al. |
| 2013/0232289 A1 | 9/2013 | Zhong et al. |
| 2013/0258738 A1 | 10/2013 | Barkon et al. |
| 2013/0265838 A1 | 10/2013 | Li |
| 2013/0290611 A1 | 10/2013 | Biederman et al. |
| 2013/0301373 A1 | 11/2013 | Tam |
| 2013/0304980 A1 | 11/2013 | Nachimuthu et al. |
| 2013/0343131 A1 | 12/2013 | Wu et al. |
| 2014/0013188 A1 | 1/2014 | Wu et al. |
| 2014/0063905 A1 | 3/2014 | Ahn et al. |
| 2014/0075133 A1 | 3/2014 | Li et al. |
| 2014/0082261 A1 | 3/2014 | Cohen et al. |
| 2014/0082456 A1 | 3/2014 | Li et al. |
| 2014/0095775 A1 | 4/2014 | Talagala et al. |
| 2014/0122818 A1 | 5/2014 | Hayasaka et al. |
| 2014/0136927 A1 | 5/2014 | Li et al. |
| 2014/0143505 A1 | 5/2014 | Sim et al. |
| 2014/0201596 A1 | 7/2014 | Baum et al. |
| 2014/0223084 A1 | 8/2014 | Lee et al. |
| 2014/0258755 A1 | 9/2014 | Stenfort |
| 2014/0269090 A1 | 9/2014 | Flynn et al. |
| 2014/0359381 A1 | 12/2014 | Takeuchi et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075292 A2 | 6/2008 |
| WO | WO 2008/121553 | 10/2008 |
| WO | WO 2008/121577 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
Barr, Introduction to Watchdog Timers, Oct. 2001, 3 pgs.
Kang, A Multi-Channel Architecture for High-Perfromance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
McLean, Information Technology-AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/8813354, Feb. 27, 2009, 9 pgs.
Pliant Technology, Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 8 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042775, Sep. 26, 2012, 9 pgs.
SanDisk Enterprise IP LLC, International Search Report / Written Opinion, PCT/US2012/059459, Feb. 14, 2013, 9 pgs.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005.
Zeidman, 1999 Verilog Designer's Library (04US), 9 pgs.
International Search Report and Written Opinion dated Jul. 25, 2014, received in International Patent Application No. PCT/US2014/029453, which corresponds to U.S. Appl. No. 13/963,444, 9 pages (Frayer).
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).
Ashkenazi et al., "Platform independent overall security architecture in multi-processor system-on-chip integrated circuits for use in mobile phones and handheld devices," ScienceDirect, Computers and Electrical Engineering 33 (2007), 18 pages.
Invitation to Pay Additional Fees dated Feb. 13, 2015 received in International Patent Application No. PCT/US2014/063949, which corresponds to U.S. Appl. No. 14/135,433, 6 pages (Delpapa).

(56) References Cited

OTHER PUBLICATIONS

International Search Report and Written Opinion dated Mar. 9, 2015, received in International Patent Application No. PCT/US2014/059747, which corresponds to U.S. Appl. No. 14/137,440, 9 pages (Fitzpatrick).

International Search Report and Written Opinion dated Jan. 21, 2015, received in International Patent Application No. PCT/US2014/059748, which corresponds to U.S. Appl. No. 14/137,511, 13 pages (Dancho).

International Search Report and Written Opinion dated Feb. 18, 2015, received in International Patent Application No. PCT/US2014/066921, which corresponds to U.S. Appl. No. 14/135,260, 13 pages (Fitzpatrick).

Lee et al., "A Semi-Preemptive Garbage Collector for Solid State Drives." Apr. 2011, IEEE, pp. 12-21.

Office Action dated Feb. 17, 2015, received in Chinese Patent Application No. 201210334987.1, which corresponds to U.S. Appl. No. 12/082,207, 9 pages (Prins).

International Search Report and Written Opinion dated May 4, 2015, received in International Patent Application No. PCT/US2014/065987, which corresponds to U.S. Appl. No. 14/135,400, 12 pages (George).

International Search Report and Written Opinion dated Mar. 17, 2015, received in International Patent Application No. PCT/US2014/067467, which corresponds to U.S. Appl. No. 14/,135,420, 13 pages (Lucas).

International Search Report and Written Opinion dated Apr. 20, 2015, received in International Patent Application No. PCT/US2014/053949, which corresponds to U.S. Appl. No. 14/135,433, 21 pages (Deipapa).

Bayer, "Prefix B-Trees", IP.COM Journal, IP.COM Inc., West Henrietta, NY, Mar. 30, 2007, 29 pages.

Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.

Oracle, "Oracle91: Database Concepts", Jul. 2001, http://docs.oracle.com/cd/A91202_01/901_doc/server.901/a88856.pdf, 49 pages.

International Search Report and Written Opinion dated Jun. 8, 2015, received in International Patent Application No. PCT/US2015/018252, which corresponds to U.S. Appl. No. 14/339,072, 9 pages (Busch).

International Search Report and Written Opinion dated Jun. 2, 2015, received in International Patent Application No. PCT/US2015/018255, which corresponds to U.S. Appl. No. 14/336,967, 14 pages (Chander).

International Search Report and Written Opinion dated Jun. 30, 2015, received in International Patent Application No. PCT/US2015/023927, which corresponds to U.S. Appl. No. 14/454,687, 11 pages (Kadayam).

International Search Report and Written Opinion dated Jul. 23, 2015, received in International Patent Application No. PCT/US2015/030850, which corresponds to U.S. Appl. No. 14/298,843, 12 pages (Ellis).

* cited by examiner

US 9,239,751 B1

COMPRESSING DATA FROM MULTIPLE READS FOR ERROR CONTROL MANAGEMENT IN MEMORY SYSTEMS

RELATED APPLICATIONS

This application claims priority to U.S. Provisional Patent Application No. 61/746,551, filed Dec. 27, 2012, which is hereby incorporated by reference in its entirety.

TECHNICAL FIELD

This disclosure relates to error control in memory systems, and in particular, to managing data that is used for soft information error control decoding.

BACKGROUND

Semiconductor memory devices, including flash memory devices, typically utilize memory cells to store data as an electrical value, such as an electrical charge or a voltage. A flash memory cell, for example, includes a single transistor with a floating gate that is used to store a charge representative of one or more data values. Increases in storage density have been facilitated in various ways, including increasing the density of memory cells, enabled by reductions in the minimum feature sizes of the semiconductor manufacturing processes used to manufacture flash memory devices, and transitioning from single-level flash memory cells to multi-level flash memory cells, so that two or more bits can be stored by each flash memory cell.

A drawback of increasing storage density is that the stored data is more prone to being stored and/or read erroneously. Error control coding ("ECC") has been utilized to limit the number of uncorrectable errors that are introduced by pseudo-random fluctuations, defects in the storage medium, operating conditions, device history, and/or write-read circuitry, etc. Error control methods using soft information are particularly promising because soft information decoding may improve the error detection and correction capability of a particular error control code, and thus the capacity of the system. However, the utilization of soft information decoding has a number of previously irresolvable drawbacks. For example, soft information decoding implementations tend to introduce undesirable delays (i.e., latencies), have relatively large semiconductor footprints, and are generally power and memory intensive.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable a system of soft decision decoding that uses less power and/or less memory. In one aspect, a sequence of data values produced by performing multiple soft reads on a memory cell is represented using a plurality of buffer locations, wherein there are fewer buffer locations than the total number of data values in the sequence. For example, in some implementations N values produced by N soft reads of a flash memory cell are represented using $M=\lceil \log_2(N+1) \rceil$ single-bit buffer locations, where $\lceil x \rceil$ represents the value of "x" rounded up to the closest integer.

BRIEF DESCRIPTION OF THE DRAWINGS

So that the present disclosure can be understood in greater detail, a more particular description may be had by reference to the aspects of various implementations, some of which are illustrated in the appended drawings. The appended drawings, however, merely illustrate the more pertinent aspects of the present disclosure and are therefore not to be considered limiting, for the description may admit to other effective aspects.

Figure 1:
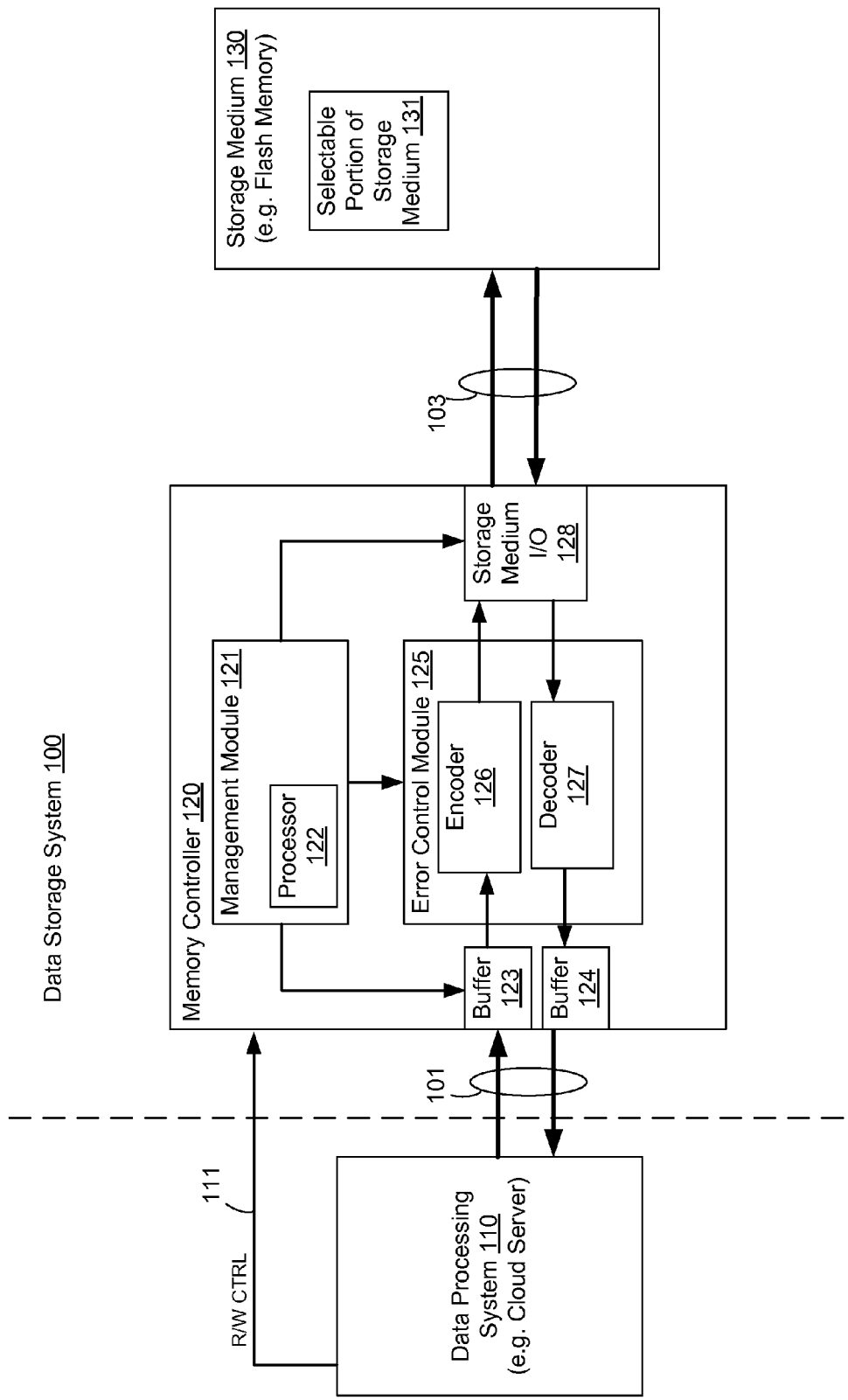
FIG. 1 is a diagram of a data storage system, in accordance with some embodiments.

In accordance with common practice the various features illustrated in the drawings may not be drawn to scale. So the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices that may enhance the performance of error control methods used to improve the reliability of a storage medium, such as a flash memory device. Some implementations generate and utilize soft information for decoding error control encoded data read from a storage medium.

More specifically, some implementations include a method of compressing a sequence of read data values into a bit-tuple of a predefined length to enable soft information decoding systems that use less power, less memory and/or less processing time. In some implementations, a bit-tuple of a predefined length is produced using M single-bit buffer locations, where M corresponds to the predefined length of the bit-tuple (i.e., the size of the compressed information unit). Some implementations utilize a collection of characterization vectors that include soft information values associated with the possible permutations of the bit-tuples and the number of read operations performed to generate an individual bit-tuple. In turn, a sequence of bit-tuples (representative of the compressed read data) is converted to a sequence of soft information values by retrieving a characterization vector, and selecting a respective soft information value from the characterization vector for each bit-tuple in the sequence. In some implementations, the sequence of bit-tuples corresponds to a codeword produced by an error control encoder during a write operation.

In some implementations, a soft information value is selected for a particular bit-tuple based at least in part on the number of read operations performed to generate the particular bit-tuple. In some implementations, a characterization vector is selected from a characterization module based on one or more storage medium characterization parameter values associated with the current state of the storage medium. Each characterization vector corresponds to a different set of storage medium characterization parameter values, which provide an indication of at least one of a physical characteristic associated with at least a portion the storage medium, a mode of operation associated with at least a portion of the storage medium, a history of use associated with at least a portion of the storage medium, a condition characteristic associated with at least a portion of the storage medium, a read type associated with at least a portion of the storage medium, and a location associated with at least a portion of the storage medium.

Numerous details are described herein in order to provide a thorough understanding of the example implementations illustrated in the accompanying drawings. However, the invention may be practiced without many of the specific details and is only limited by the language of the claims. Well-known methods, components, and circuits have not been described in exhaustive detail so as not to unnecessarily obscure more pertinent aspects of the implementations described herein.

FIG. 1 is a diagram of an implementation of a data storage system 100. While some example features are illustrated, those skilled in the art will appreciate from the present disclosure that various other features have not been illustrated for the sake of brevity and so as not to obscure more pertinent aspects of the example implementations disclosed herein. To that end, as a non-limiting example, the data storage system 100 includes a memory controller 120, and a storage medium 130, and is used in conjunction with a computer system 110. In some implementations, storage medium 130 is a single flash memory device while in other implementations storage medium 130 includes a plurality of flash memory devices. In some implementations, storage medium 130 comprises at least one of NAND-type flash memory and NOR-type flash memory. Further, in some implementations memory controller 120 is a solid-state drive (SSD) controller. However, those skilled in the art will appreciate that various other types of storage media may be included in accordance with aspects of a wide variety of implementations.

Computer system 110 is coupled to memory controller 120 through data connections 101. Moreover, those skilled in the art will appreciate from the present disclosure that in various implementations computer system 110 includes memory controller 120 as a component and/or a sub-system. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. In some implementations, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to memory controller 120 through connections 103. Connections 103 are sometimes called data connections, but typically convey commands in addition to data, and optionally convey metadata, error correction information and/or other information in addition to data values to be stored in storage medium 130 and data values read from storage medium 130. Moreover, those skilled in the art will appreciate from the present disclosure that in various implementations memory controller 120 and storage medium 130 are included in the same device as components thereof. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or be stored) in secondary storage, such as hard disk drivers. Additionally and/or alternatively, flash memory can also be configured for relatively smaller-scale applications such as personal flash drives or hard-disk replacements for personal, laptop and tablet computers.

Storage medium 130 is divided into a number of addressable and individually selectable blocks, such as selectable portion 131. In some implementations the individually selectable blocks are the minimum size erasable units in a flash memory device. In other words, each block contains the minimum number of memory cells that can be erased simultaneously. Each block is usually further divided into a plurality of pages and/or wordlines, where each page or wordline is typically an instance of the smallest individually accessible portion in a block. However, in some implementations (e.g., using some types of flash memory) the minimum unit of a data set is a sector, which is subunit of a page. That is, block includes multiple pages, each page contains a plurality of sectors, and each sector is the minimum unit of data for data writing or reading to the flash memory device.

For example, one block may comprise any number of pages, for example, 64 pages, 128 pages, 256 pages, or another suitable number of pages. Blocks are typically grouped into a plurality of zones. Each block zone can be independently managed to some extent, which increases the degree of parallelism for parallel operations and simplifies management of storage medium 130.

As noted above, while data storage densities of non-volatile semiconductor memory devices are generally increasing, a drawback of increasing storage density is that the stored data is more prone to being stored and/or read erroneously. As described in greater detail below, error control coding can be utilized to limit the number of uncorrectable errors that are introduced by pseudo-random fluctuations, defects in the storage medium, operating conditions, device history, write-read circuitry, etc., or a combination of these and various other factors.

In some implementations, memory controller 120 includes a management module 121, an input buffer 123, an output buffer 124, an error control module 125 and a storage medium interface (I/O) 128. Those skilled in the art will appreciate from the present disclosure that memory controller 120 may include various additional features that have not been illustrated for the sake of brevity and so as not to obscure more pertinent features of the example implementations disclosed herein, and that a different arrangement of features may be possible. Input and output buffers 123,124 provide an interface to computer system 110 through data connections 101. Similarly, storage medium I/O 128 provides an interface to storage medium 130 though connections 103. In some implementations, storage medium I/O 128 includes read and write circuitry, including circuitry capable of providing reading signals to storage medium 130 (e.g., reading threshold voltages for NAND-type flash memory).

In some implementations, management module 121 includes a processor 122 configured to execute instructions in one or more programs, e.g., in management module 121. However, those skilled in the art will appreciate from the present disclosure that processor 122 may be shared by one or more components within, and in some cases, beyond the function of memory controller 120. Management module 121 is coupled to input and output buffers 123, 124, error control module 125 and storage medium I/O 128 in order to coordinate the operation of these components.

Error control module 125 is coupled between storage medium I/O 128 and the input and output buffers 123, 124. Error control module 125 is provided to limit the number of uncorrectable errors inadvertently introduced into data. To that end, error control module 125 includes an encoder 126 and a decoder 127. Encoder 126 encodes data by applying an error control code to produce a codeword, which is subsequently stored in storage medium 130. When the encoded data (a codeword) is read from the storage medium, decoder 127 applies a decoding process to the codeword to recover the data, and to correct errors in the recovered data within the error correcting capability of the error control code. Those skilled in the art will appreciate from the present disclosure that various error control codes have different error detection and correction capacities, and that particular codes are selected for various applications for reasons beyond the scope of this disclosure. As such, an exhaustive review of the various types of error control codes is provided herein. Moreover, those skilled in the art will appreciate that each type or family of error control codes may have encoding and decoding algorithms that are particular to the type or family of error control codes. On the other hand some algorithms, such as the Viterbi algorithm, may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, input buffer 123 receives data to be stored in storage medium 130 from computer system 110. The data held in input buffer 123 is made available to encoder 126, which encodes the data to produce a codeword. The codeword is made available to the storage medium I/O 128, which transfers the codeword to storage medium 130 in a manner dependent on the type of storage medium being utilized. During a read operation for the same data, storage medium I/O 128 accesses the portion of storage medium 130 in which the corresponding codeword is stored to read the codeword and provide the codeword to decoder 127. In various embodiments, the codeword has more than 1000 bits, 2000 bits, 4000 bits, or 8000 bits.

If the decoding is successful, the decoded data is provided to output buffer 124, where the decoded data is made available to computer system 110. In some implementations, if the decoding is not successful, memory controller 120 may resort to a number of remedial actions or provide an indication of an irresolvable error condition.

For many error control codes, the decoding process can be improved by using soft information, which takes into consideration the probabilities of interpreting the output of read operations in more than one way. Hard information decoding generally means that absolute decisions are made as to whether a data value (e.g., data-bit or code-bit) is one symbol or another in a particular symbol alphabet. For example, in a binary system, a particular data value can be either "0" or "1", even if the raw electrical analog value read from a storage location does not indicate that the electrical value representing the data value is sufficient to decide with certainty that the data value is "0" or "1." In other words, a hard-decision for a particular data value is based on the most likely symbol corresponding to the analog electrical value read from the storage medium, and the probabilities that alternative decisions may be true are ignored by the hard-decision process. Often the hard-decision is based on the Euclidean distances from the analog read value to electrical level(s) defining the symbols.

By contrast, the use of soft information does not ignore the probabilities that different outcomes may be true in view of what is read from the storage medium. Error control methods using soft information are particularly promising because soft information decoding often improves the error detection and correction capability of a particular error control code, and thus the capacity of the system. However, the utilization of soft information decoding has been limited because of a number of previously irresolvable drawbacks, including increased power consumption, memory usage and added delays for generating and conveying the soft information. One particularly difficult challenge has been managing the delay, memory usage and power consumption previously required to create, store and transfer soft information between functional components. For example, using previous methods, soft information generation required reading a memory cell (sometimes called a memory location) multiple times and combining the read results to generate a statistically accurate soft information value for each bit or symbol stored in the memory cell. The accuracy of the soft information generally improves with the number of read operations performed, until a point of diminishing returns. But each read adds a delay, and the aggregate delay to generate accurate soft information for an entire sequence of data values is undesirable. Each read operation also increases the amount of memory used to store the read data values prior to conversion into soft information values. Each read operation also increases power consumption in at least three ways. First, power is consumed for each additional read operation performed. Second, power is consumed by the storage of the additional raw read data values produced by each additional read. Third, power is consumed when the raw read data values are transmitted from one functional block to another.

As discussed in more detail below, some implementations include systems, methods and/or devices enabled to utilize soft information error correction decoding to support the use of flash memory or other storage mediums. In some implementations delay, power consumption, and/or memory usage are reduced during the generation of soft information from multiple read operations. To that end, raw read data from each memory location is compressed into a corresponding bit-tuple representing the result of a number of sequential read operations. The bit-tuple is then used to retrieve a soft information value (e.g., a log-likelihood ratio, LLR) from a stored characterization vector associated with the current state of the storage medium, as identified by a set of storage medium characterization parameter values. In some implementations, memory usage is reduced because the amount of memory required to store a bit-tuple is smaller than the amount of memory required to store the corresponding sequence of raw read data values obtained (read) from a single memory location. As such, in aggregate, the total amount of memory required to store a group of bit-tuples for one or more codewords is significantly smaller (e.g., in some implementations, more than 50% smaller) than the total amount of memory required to store the corresponding raw read data for the one or more codewords, obtained by multiple read operations. In some implementations, power consumption is reduced because less power is consumed to store a group of bit-tuples as compared to storing the raw read data for one or more codewords obtained by multiple read operations. In some implementations, delay is reduced by looking up a soft information value in a characterization vector based on a bit-tuple rather than computing the soft information value from the raw read data. In some implementations, delay is reduced because less time is needed to transfer a set of bit-tuples between system components (e.g., from storage medium 130 to memory controller 120), as compared to the time needed to transfer the corresponding raw read data values between system components.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some implementations, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, the reading threshold voltages (also called reading signals and reading voltages) applied to a flash memory cells are gate voltages applied to the gates of the flash memory cells to determine whether the memory cells conduct current at that gate voltage. In some implementations, when a flash memory cell's transistor conducts current at a given reading threshold voltage, indicating that the cell voltage is less than the reading threshold voltage, the raw data value for that read operation is a "1" and otherwise it is a "0".

In some implementations, the memory cell voltage of a memory cell is read indirectly, by reading the memory cell using one or more reading threshold voltages. More specifically, each read operation produces a result that indicates whether the cell voltage of the memory cell is greater than or less than the reading threshold voltage used during that read operation. By reading the memory cell using multiple reading threshold voltages, the cell voltage can be determine more precisely than if the memory cell were read using only a single reading threshold voltage. Stated another way, the more read operations that are performed on a memory cell, each using a different reading threshold voltage, the more precisely the cell voltage of the memory cell is known.

It is noted that while the specific methodology for reading raw data from a flash memory device may vary from one storage medium to another, the systems and methodologies described here for representing the resulting raw read data using a smaller number of buffer locations than raw data values are independent of the specific methodology used for reading raw data from the flash memory device(s).

A single-level flash memory cell (SLC) stores one bit of information ("0" or "1"). So the storage density of a SLC memory device is one bit per memory cell. A multi-level flash memory cell (MLC) can store two or more bits by using different ranges within the total voltage range of the memory cell to represent a multi-bit bit-tuple. In turn, the storage density of a MLC memory device is multiple-bits per cell (e.g., two bits per memory cell).

As discussed below with reference to FIGS. 2B and 2C, a MLC memory device is used to store multiple bits by using voltage ranges within the total voltage range of a memory cell to represent different bit-tuples. A MLC memory device is typically more error prone than a SLC memory device created using the same manufacturing process because the effective voltage difference between the voltages used to store different data values is smaller for a MLC memory device. Moreover, due to a number of error-inducing factors, a typical error includes the cell voltage of a particular MLC shifting to a voltage range that is adjacent to the voltage range that would otherwise be representative of the correct bit-tuple. Such error-inducing factors include, without limitation, pseudo-random electrical fluctuations, defects in the storage medium, operating conditions, device history (e.g., a count of the number of program-erase (P/E) cycles performed by the storage device), suboptimal performance or design and/or degradation of write-read circuitry, or a combination of these and other factors. As discussed in greater detail below with reference to FIGS. 2B and 2C, the impact of such errors can be reduced by grey-coding the data, such that there are only single-bit changes between bit-tuples in adjacent voltage ranges.

Figure 2A:
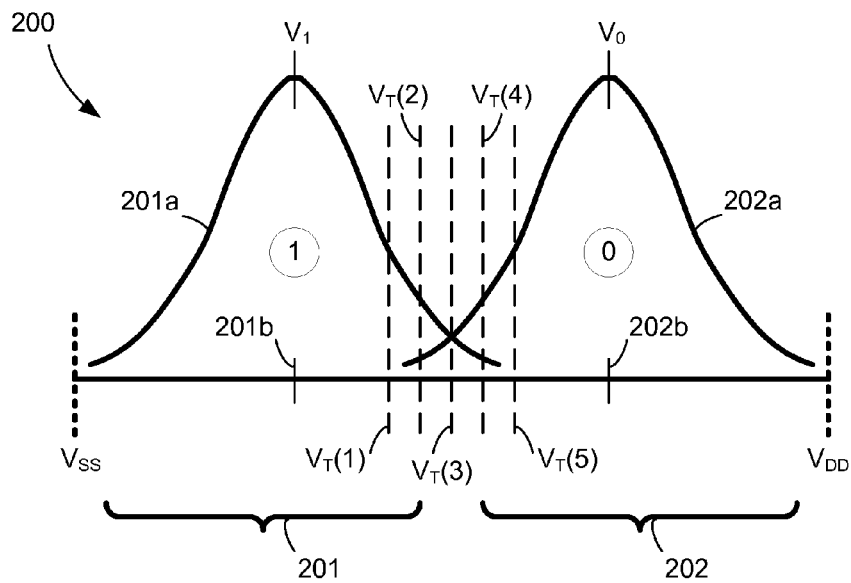
FIG. 2A is a diagram of voltage distributions that may be found in a single-level flash memory cell (SLC) over time and a sequence of reading threshold voltages, in accordance with some embodiments.

One strategy used to characterize and/or read a data value stored in a memory location is to read the memory location multiple times, using a plurality of distinct reading threshold voltages (sometimes herein called reading voltages or reading signals) distributed across the transition or overlap between adjacent voltage ranges in the memory cell. For example, FIG. 2A is a simplified, prophetic diagram of voltage distributions 200 that may be found in a single-level (SLC) flash memory cell over time, and a sequence of reading threshold voltages $V_T(1), V_T(2), V_T(3), V_T(4), V_T(5)$ that are applied to the SLC during a sequential set of read operations according to some implementations. Those skilled in the art will appreciate from the present disclosure that the voltage distributions 200 have been simplified for illustrative purposes. In this example, the SLC memory cell voltage range approximately extends from a voltage, $V_{SS}$, at the source terminal of a NMOS transistor to a voltage, $V_{DD}$, at the drain terminal of the same NMOS transistor. As such, voltage distributions 200 extend between $V_{SS}$ and $V_{DD}$.

Sequential voltage ranges 201, 202 between the source and drain voltages, $V_{SS}$ and $V_{DD}$, are used to represent corresponding bit values "1" and "0," respectively. Each voltage range 201 and 202 has a respective center voltage $V_1$ 201b and $V_0$ 202b. Each voltage range 201 and 202 also has a respective distribution of voltages 201a and 202a that may occur as a result of any number of a combination of error-inducing factors, examples of which are identified above.

Preferably, during a write operation, to write a respective desired bit value to a SLC flash memory cell the charge on the floating gate of the SLC flash memory cell is set such that the resultant cell voltage (i.e., the cell's resultant threshold voltage) is at the center of one of the ranges 201, 202. In other words, the resultant cell voltage is, ideally, set to one of $V_1$ 201b and $V_0$ 202b in order to write a respective one of the bit values "1" and "0." Under typical operating conditions, however, due in part to the error-inducing factors described above, the actual cell voltage may differ from the center voltage for the data written to the SLC flash memory cell.

In some implementations, reading threshold voltages $V_T(1)$, $V_T(2)$, $V_T(3)$, $V_T(4)$, $V_T(5)$ are applied between adjacent center voltages, e.g., applied proximate to the halfway region between adjacent center voltages $V_1$ 201b, and $V_0$ 202b. Optionally, in some implementations, some or all of the reading threshold voltages are located between voltage ranges 201, 202. In some implementations, reading threshold voltages $V_T(1)$, $V_T(2)$, $V_T(3)$, $V_T(4)$, $V_T(5)$ are applied in the region proximate to where the voltage distributions 201a, 202a overlap, which is not necessarily proximate to the halfway region between adjacent center voltages $V_1$ 201b, and $V_0$ 202b. In some implementations, during a sequence of read operations, reading threshold voltages $V_T(1)$, $V_T(2)$, $V_T(3)$, $V_T(4)$, $V_T(5)$ are sequentially applied, such that the application of each reading threshold voltage yields a raw read data value associated with each memory cell that is read. Consequently, for reading threshold voltages $V_T(1)$, $V_T(2)$, $V_T(3)$, $V_T(4)$, $V_T(5)$, five separate raw read data values are obtained for each memory location. Those skilled in the art will appreciate that any number of two or more reading threshold voltages can be used in various implementations, and that the five reading threshold voltages described with reference FIG. 2A are merely provided as an illustrative example.

More generally, the sequence of raw read data values obtained from a memory cell is a N-bit binary sequence, generated by a sequence of N read operations. As described in more detail below, in some implementations, the reading threshold voltages used in the sequence of N read operations is a monotonically increasing or decreasing sequence of reading threshold voltages. In some implementations, the monotonically increasing or decreasing sequence of reading threshold voltages are applied non-sequentially and the resulting raw data values are re-ordered so that the resulting raw data values are thus arranged as though the reading threshold voltages had been applied sequentially.

As described above, in many circumstances the memory cell current sensed in response to the applied reading threshold voltages $V_T(1)$, $V_T(2)$, $V_T(3)$, $V_T(4)$, $V_T(5)$ is indicative of a memory cell voltage different from the respective center voltage $V_1$ 201b or $V_0$ 202b corresponding to the respective bit value written into the memory cell. Errors in cell voltage, and/or the cell voltage sensed when reading the memory cell, can occur during write operations, read operations, or due to "drift" of the cell voltage between the time data is written to the memory cell and the time a read operation is performed to read the data stored in the memory cell. For ease of discussion, these effects are collectively described as "cell voltage drift."

Again, as compared to a SLC, a MLC memory device is used to store multiple bits by using four or more distinct voltage ranges within the total voltage range of the memory cell to represent different bit-tuples. FIG. 2B is a simplified, prophetic diagram of memory cell voltage distributions 210a found in the memory cells of a MLC memory device over time and a sequence of reading threshold voltages $V_{Ta}(1)$, $V_{Ta}(2)$, $V_{Ta}(3)$, $V_{Ta}(4)$, $V_{Ta}(5)$ that are applied to memory cells of the MLC memory device during a sequential set of read operations for a lower page read according to some implementations. Similar to a SLC, the cell voltage range of a MLC approximately extends from the voltage, $V_{SS}$, at the source terminal of a NMOS transistor to the voltage, $V_{DD}$, at the drain terminal of the NMOS transistor. As such, voltage distributions 210a extend between $V_{SS}$ and $V_{DD}$.

Sequential voltage ranges 211, 212, 213, 214 between the source and drain voltages, $V_{SS}$ and $V_{DD}$, are used to represent corresponding bit-tuples "11", "01", "00", "10", respectively. Each voltage range 211, 212, 213, 214 has a respective center voltage 211b, 212b, 213b, 214b. Each voltage range 211, 212, 213, 214 also has a respective distribution of voltages 211a, 212a, 213a, 214a that may occur as a result of any number or combination of the error-inducing factors described above.

As noted above, errors in the cell voltage of a MLC and/or the cell voltage sensed are sometimes caused by the cell voltage drifting to a range corresponding to a different bit-tuple from the correct voltage range of the bit-tuple written to the MLC. One way to reduce the impact of a cell voltage drifting from one voltage range to an adjacent voltage range is to grey-code the bit-tuples. Grey-coding the bit-tuples includes constraining the assignment of bit-tuples to memory cell voltage ranges such that the respective bit-tuple of a particular voltage range is different from the respective bit-tuple of an adjacent voltage range by only one bit. For example, as shown in FIGS. 2B and 2C, the corresponding bit-tuples for the adjacent ranges 211 and 212 are respectively "11" and "01", the corresponding bit-tuples for the adjacent ranges 212 and 213 are respectively "01" and "00", and the corresponding bit-tuples for the adjacent ranges 213 and 214 are respectively "00" and "10". Using grey-coding, if a particular cell voltage drifts to an adjacent range, the error is typically limited to a single bit within the 2-bit bit-tuple. The probability that a particular cell voltage drifts beyond an adjacent range is typically small, for example less than one percent, if not negligible.

Preferably, during a write operation, the charge on the floating gate of the MLC would be set such that the resultant cell voltage is at the center of one of the ranges 211, 212, 213, 214 in order to write the corresponding bit-tuple to the MLC. In other words, ideally, the resultant cell voltage would be set to one of $V_{11}$ 211b, $V_{10}$ 212b, $V_{00}$ 213b and $V_{10}$ 214b in order to write a corresponding one of the bit-tuples "11", "01", "00" and "10." More typically, though, the resultant cell voltage is set to a value within a predefined range (e.g., 50, 100 or 200 millivolts) of a respective center voltage $V_{11}$ 211b, $V_{10}$ 212b, $V_{00}$ 213b and $V_{10}$ 214b corresponding to the bit-tuple written to the MLC.

Figure 2B:
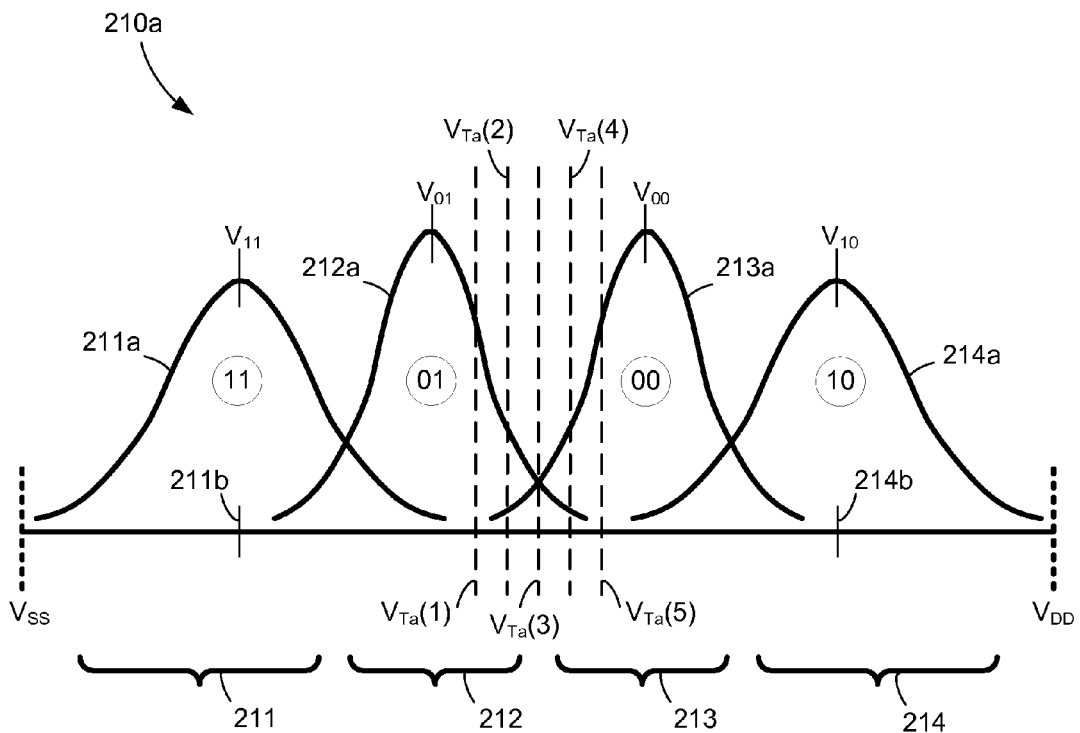
FIG. 2B is a diagram of voltage distributions that may be found in a multi-level flash memory cell over time and a sequence of reading threshold voltages for a lower page read in accordance with some embodiments.
Figure 2C:
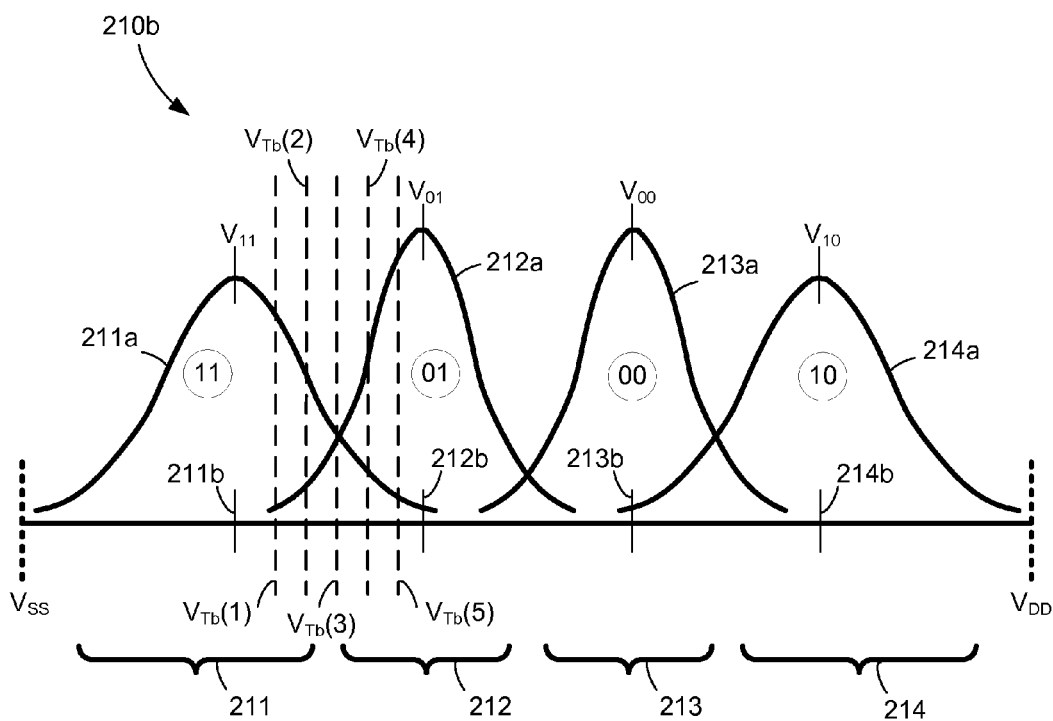
FIG. 2C is a diagram of voltage distributions that may be found in a multi-level flash memory cell over time and a sequence of reading threshold voltages for an upper page read, in accordance with some embodiments.

As illustrated in FIGS. 2B and 2C and as described throughout the present disclosure, the least significant bit (i.e., the right-most bit) of each bit-tuple corresponds to the "lower page" bit value of a MLC, and that the most significant bit (i.e., the left-most bit) of each bit-tuple corresponds to the "upper page" bit value of the MLC. However, those skilled in the art will appreciate that in other implementations the relative positions of the upper and lower page bits can be exchanged. Moreover, under typical operating conditions, however, due in part to the factors described above, the actual cell voltage may differ from the center voltage for the data written to the MLC.

With further reference to FIG. 2B, in some implementations, for a lower page read, reading threshold voltages $V_{Ta}(1)$, $V_{Ta}(2)$, $V_{Ta}(3)$, $V_{Ta}(4)$, $V_{Ta}(5)$ are applied between adjacent center voltages, e.g., applied proximate to the halfway region between adjacent center voltages $V_{01}$ 212b and $V_{00}$ 213b, and thus define threshold voltages between the voltage ranges 212, 213. In some implementations, reading threshold voltages $V_{Ta}(1)$, $V_{Ta}(2)$, $V_{Ta}(3)$, $V_{Ta}(4)$, $V_{Ta}(5)$ are applied in the region proximate to where the voltage distributions 212a, 213a overlap, which may not necessarily be proximate to the halfway region between adjacent center voltages $V_{01}$ 212b and $V_{00}$ 213b. In some implementations, during a lower page read operation, reading threshold voltages $V_{Ta}(1)$, $V_{Ta}(2)$, $V_{Ta}(3)$, $V_{Ta}(4)$, $V_{Ta}(5)$ are sequentially applied, such that the application of each reading threshold voltage yields a raw read data value. Thus, for reading threshold voltages $V_{Ta}(1)$, $V_{Ta}(2)$, $V_{Ta}(3)$, $V_{Ta}(4)$, $V_{Ta}(5)$ five separate raw lower page read data values are obtained for each memory location (i.e., MLC). Those skilled in the art will appreciate that any number of two or more reading threshold voltages can be used in various implementations, and that the five reading threshold voltages described with reference FIG. 2B are merely provided as an illustrative example.

More generally, the sequence of raw read data values is a N-bit binary sequence, generated by a sequence of N lower page read operations from a single memory location. As described in more detail below, the reading threshold voltages used for a sequence of read operations includes a monotonically increasing or decreasing sequence of reading threshold voltages. In some implementations, the monotonically increasing or decreasing sequence of reading threshold voltages can be applied non-sequentially and the resulting raw lower page data values re-ordered so that the resulting raw lower page data values are thus arranged as though the reading threshold voltages had been applied sequentially.

FIG. 2C is a simplified, prophetic diagram of voltage distributions 210b that may be found in a multi-level flash memory cell over time and a sequence of reading threshold voltages $V_{Tb}(1)$, $V_{Tb}(2)$, $V_{Tb}(3)$, $V_{Tb}(4)$, $V_{Tb}(5)$ that are applied to the MLC during a sequential set of read operations for an upper page read according to some implementations. The voltage distributions 210b illustrated in FIG. 2C are similar to and adapted from the voltage distributions 210a illustrated in FIG. 2B. Elements common to each include common reference numbers, and only the differences between FIGS. 2B and 2C are described herein for the sake of brevity.

For an upper page read, the upper page bit of a memory location can be read by applying the reading threshold voltages $V_{Tb}(1)$, $V_{Tb}(2)$, $V_{Tb}(3)$, $V_{Tb}(4)$, $V_{Tb}(5)$ across the respective transition between voltage distributions 211a and 212a or the respective transition between voltage distributions 213a and 214a. As an example only, as shown in FIG. 2C, the reading threshold voltages $V_{Tb}(1)$, $V_{Tb}(2)$, $V_{Tb}(3)$, $V_{Tb}(4)$, $V_{Tb}(5)$ are applied across the transition between voltage distributions 211a and 212a. As noted above, the reading threshold voltages $V_{Tb}(1)$, $V_{Tb}(2)$, $V_{Tb}(3)$, $V_{Tb}(4)$, $V_{Tb}(5)$ can either be applied proximate to the halfway region between adjacent center voltages $V_{11}$ and $V_{01}$, or in the region proximate to where the voltage distributions 211a, 212a overlap, which is not necessarily proximate to the halfway region between adjacent center voltages $V_{11}$ 211b and $V_{01}$ 212b. Again, those skilled in the art will appreciate that any number of two or more reading threshold voltages can be used in various implementations, and that the five reading threshold voltages described with reference FIG. 2C are merely provided as an illustrative example.

More generally, a sequence of raw read data values for a single memory location is a N-bit binary sequence. In the example shown in FIG. 2C, the raw read data values are generated by a sequence of N upper page read operations from a single memory location. As described in more detail below, the reading threshold voltages used for a sequence of read operations includes a monotonically increasing or decreasing sequence of reading threshold voltages. In some implementations, the monotonically increasing or decreasing sequence of reading threshold voltages can be applied non-sequentially and the resulting raw upper page data values re-ordered so that the resulting raw upper page data values are thus arranged as though the reading threshold voltages had been applied sequentially.

Figure 3:
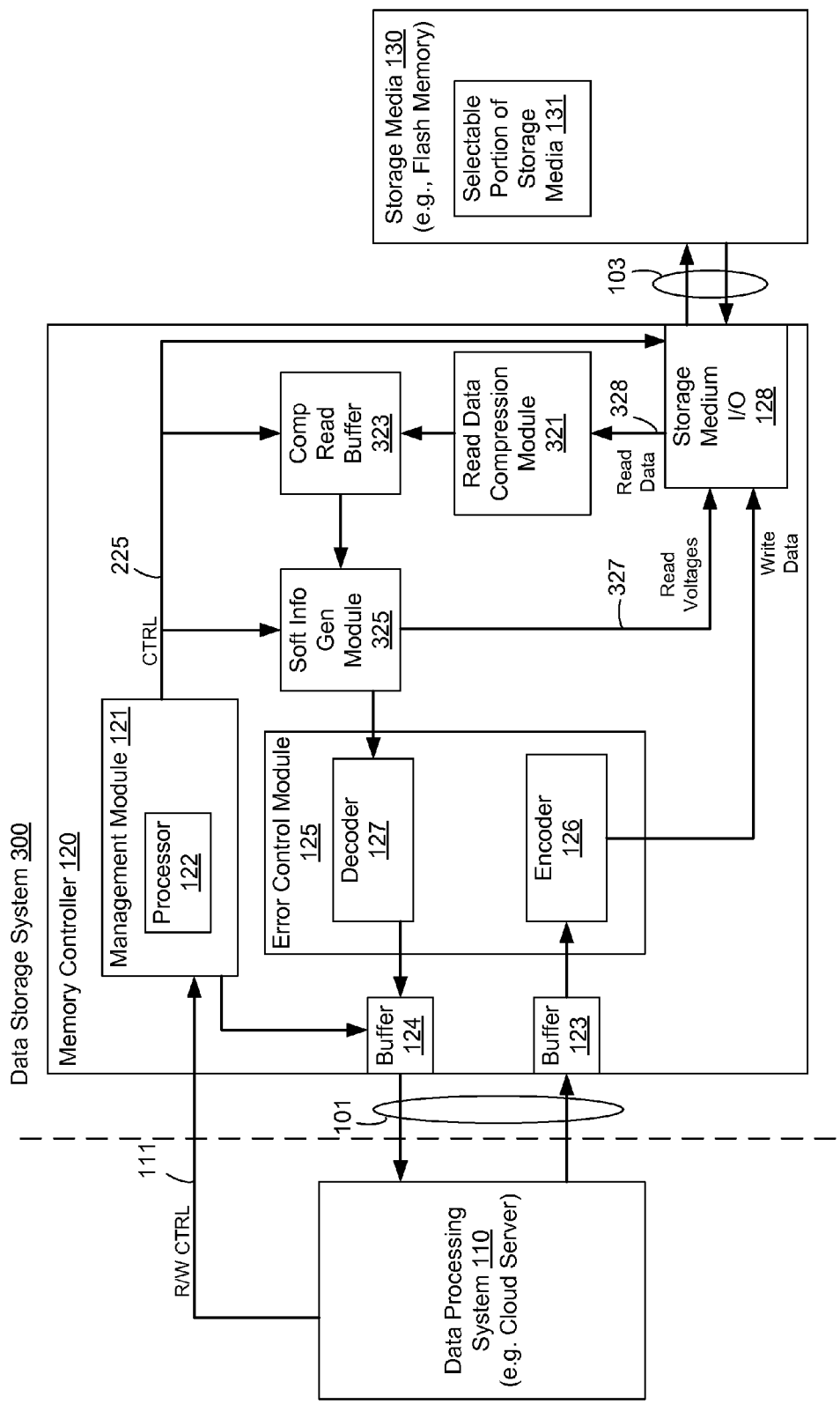
FIG. 3 is a diagram of a data storage system, including a soft information generation module and a read data compression module, in accordance with some embodiments.

FIG. 3 is a diagram of a data storage system 300, including a soft information generation module 325 and a read data compression module 321, in accordance with some embodiments. Data storage system 300 illustrated in FIG. 3 is similar to and adapted from data storage system 100 illustrated in FIG. 1. Elements common to each include common reference numbers, and only the differences between FIGS. 1 and 3 are described herein for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein.

To that end, as a non-limiting example, data storage system 300, and in particular, memory controller 120 has been further configured to compress read data values from multiple read operations and utilize soft information for error control decoding. More specifically, memory controller 120 further includes read data compression module 321, a compressed read data buffer 323, and soft information generation module 325. As discussed below with reference to FIG. 10, in some other embodiments the read data compression module is implemented in the storage medium 130.

Soft information generation module 325 is coupled to management module 121, error control module 125 and storage medium I/O 128. Management module 121 is connected to provide soft information generation module 325 a control signal on a control line 225. Soft information generation module 325 is connected to provide decoder 127 with at least one sequence of soft information corresponding to the raw read data 328 retrieved by the storage medium 130 (obtained via storage medium I/O 128 in embodiments represented by FIG. 3). Additionally, in some implementations, soft information generation module 325 is also connected to provide one or more sets of reading threshold voltages to storage medium 130 via data line 327 and storage medium I/O 128.

Read data compression module 321 is coupled to receive raw read data values 328 from storage medium 130 via storage medium I/O 128. Read data compression module 321 is configured to compress an N-bit sequence of raw read data values associated with a particular memory location into a bit-tuple of a predefined length, M. In other words, in some implementations, read data compression module 321 is included in a device operable to compress a N-bit binary sequence, the N-bit binary sequence having an initial sub-sequence of M bits and a remaining sub-sequence of N–M bits. As such, read data compression module 321 produces a sequence of bit-tuples corresponding to an entire codeword by compressing the raw read data values for a set of memory locations associated with the entire codeword. One or more sequences of bit-tuples produced by read data compression module 321 is stored in compressed read data buffer 323. Compressed read data buffer 323 is accessible by soft information generation module 325 to generate corresponding sequences of soft information values. Soft information generation module 325 generates soft information values by utilizing a pre-generated collection of characterization vectors for various combinations of storage medium characterization parameter values. As described in further detail below with reference to FIG. 4, each characterization vector includes soft information values associated with one or more permutations of bit-tuples. The sequences of soft information are generated and passed to decoder 127 for soft information decoding. In some implementations, decoder 127 is configured to decode sequences of soft information one codeword at a time. In some implementations, decoder 127 is configured to decode sequences of soft information corresponding to two or more codewords in parallel.

During a write operation, as described above, input buffer 123 receives data to be stored in storage medium 130 from computer system 110. The data in input buffer 123 is made available to encoder 126, which encodes the data to produce a codeword. The codeword is conveyed to storage medium via storage medium I/O 128, which transfers the codeword to storage medium 130 in a manner dependent on the type of storage medium being utilized. For example, for MLC flash memory, each bit-tuple of the codeword is written into a respective memory cell by changing the charge on the floating gate of the respective memory cell.

A read operation is initiated when computer system 110 sends a read command on control line 111 to memory controller 120 to request read data from storage medium 130. Memory controller 120 sends read operation commands to storage medium 130, via storage medium I/O 128, to obtain raw read data values 328 for each memory location that is read in response to the read command. Raw read data values 328 are sent to and processed by read data compression module 321, the operation of which is described in more detail below with reference to FIG. 4. For each memory location that has been read, read data compression module 321 produces a bit-tuple of a predefined length, M, and stores the bit-tuples in compressed read data buffer 323. Soft information generation module 325 generates a soft information value for each bit-tuple in compressed read data buffer 323 by selecting a respective soft information value from a characterization vector. Decoder 127 is configured to decode sequences of soft information corresponding to codewords to as to produce decoded, error-free read data corresponding to the received read command.

In some implementations, management module 121 also passes the read request to soft information generation module 325 so that soft information generation module 325 can select reading threshold voltages for use by storage medium 130. In some other implementations, management module 121 selects the reading threshold voltages for use by storage medium 130. In yet other implementations, storage medium I/O 128 selects the reading threshold voltages.

As described below with reference to FIG. 4, the read process can be modified to utilize information about the current state of storage medium 130. For example, information about the current state of storage medium 130 can be utilized to select reading threshold voltages in accordance with the current state of storage medium 130. In some implementations, information about the current state of storage medium 130 is provided in the form of one or more storage medium characterization parameter values. More specifically, in some implementations, the one or more storage medium characterization parameter values provide an indication of at least one of a physical characteristic associated with at least a portion the storage medium, a mode of operation associated with at least a portion of the storage medium, a history of use associated with at least a portion of the storage medium, a condition characteristic associated with at least a portion of the storage medium, a read type associated with at least a portion of the storage medium, and a location associated with at least a portion of the storage medium. In some implementations, the one or more storage medium characterization parameter values includes an indicator of the storage medium locations being accessed, an indicator of the number of previous program/erase cycles of the storage medium (or, alternatively, an indicator of the number of previous program/erase cycles of the storage medium locations being accessed), and an indicator of the current temperature of the storage medium 130.

Figure 4:
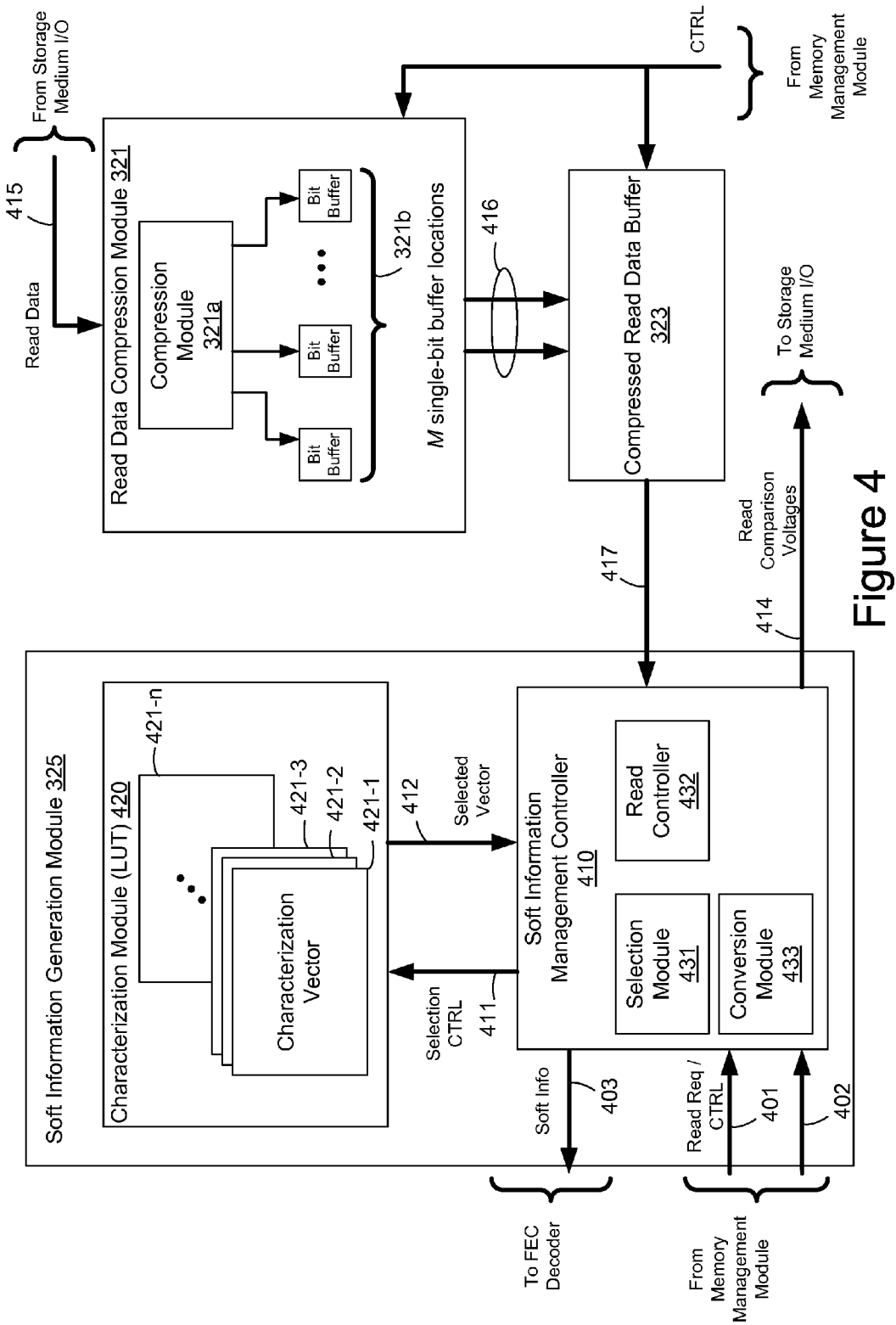
FIG. 4 is a more detailed diagram of the soft information generation module and the read data compression module shown in FIG. 3, in accordance with some embodiments.

FIG. 4 is a more detailed diagram of an implementation of soft information generation module 325 and read data compression module 321, both of which are shown in less detail in FIG. 3. As a non-limiting example, soft information generation module 325 includes a soft information management controller 410 and a characterization module 420. Moreover, while certain specific features are illustrated, those skilled in the art will appreciate from the present disclosure that various other features have not been illustrated for the sake of brevity and so as not to obscure more pertinent aspects of the example implementations disclosed herein.

Extending the read operation example from above, in some implementations memory controller 120 receives one or more storage medium characterization parameter values, which characterize the current state of storage medium 130, from computer system 110 along with the read request. In some other implementations, storage medium characterization parameter values are stored internally by memory controller 120 and memory controller 120 retrieves the one or more storage medium characterization parameter values in response to receiving the read request from computer system 110. The one or more storage medium characterization parameter values are passed to soft information generation module 325. The one or more storage medium characterization parameter values are used by soft information generation module 325 to select a characterization vector associated with the current state of storage medium 130.

To that end, soft information management controller 410 is connected to receive the read request and one or more storage medium characterization parameters on control and data lines 401 and 402, respectively. Soft information management controller 410 is also connected to provide characterization module 420 a selection control signal on control line 411, and to receive a selected characterization vector on data line 412. In some implementations, soft information management controller 410 is further connected to provide reading threshold voltages to storage medium 130 via data line 414 and storage medium I/O 128, and receive bit-tuples from compressed read data buffer 323 through data line 417. Soft information management controller 410 is also connected to provide sequences of soft information values to decoder 127 (FIG. 3) on data line 403.

Characterization module 420 includes a collection of characterization vectors 421-1, 421-2, 421-3, . . . 421-n, that each store characterization data, such as soft information values for bit-tuples and reading threshold voltages, associated with storage medium 130 for one or more storage medium characterization parameter values. In some implementations, the characterization data stored in the characterization vectors 421 is statistically derived. More detailed example implementations of characterization vectors 421 are described in co-pending U.S. patent application Ser. No. 13/602,031, entitled "Statistical Read Comparison Signal Generation for Memory Systems," which is hereby incorporated by reference in its entirety.

Soft information management controller 410 includes a selection module 431, a read controller 432, and a conversion module 433. The selection module 431 is configured to use the one or more storage medium characterization parameters values to select a characterization vector from the stored collection of characterization vectors 421-1, 421-2, 421-3, . . . 421-n in accordance with the current state of storage medium 130. In some implementations, the selection control signal includes one or more of storage medium characterization parameters values and/or an index key associated with a combination of one or more of storage medium characterization parameters values.

Read controller 432 is configured to read a portion of storage medium 130 via storage medium I/O 128. In some implementations, read controller 432 is configured to provide storage medium 130 with reading threshold voltages that are used to read the same portion of storage medium 130 multiple times.

Conversion module 433 is configured to generate a sequence of soft information values corresponding to the bit-tuples stored in compressed read data buffer 323. The sequence of soft information values is generated, at least in part, by selecting a respective soft information value (e.g., a LLR, a transition probability, etc.) from the selected characterization vector for each bit-tuple. In some implementations, soft information is generated by a device characterization process for memory devices produced by a particular manufacturing process, and stored in a characterization module or look-up table included in soft information generation module 325.

Read data compression module 321 includes a compression module 321a and M single-bit buffer locations 321b. As described below with reference to FIGS. 5A-5B and 6-9, read data compression module 321 is configured to compress a sequence of raw read data values, generated by a corresponding sequence of read operations from a single memory location, into an bit-tuple that is smaller than the sequence of raw read data values. To that end, read data compression module 321 is configured to receive raw read data values from the storage medium 130 via data line 415, and write the generated bit-tuples to compressed read data buffer 323 over data lines 416. More generally, read data compression module 321 includes a device operable to compress a N-bit binary sequence, the N-bit binary sequence having an initial sub-sequence of M bits and a remaining sub-sequence of N–M bits. In some implementations, the device includes M single-bit buffer locations (where N is greater than M), and a compression module. In some implementations the compression module is configured to: populate the M single-bit buffer locations by setting each respective single-bit buffer location to a corresponding value (e.g., "000", FIG. 9) from the initial sub-sequence of M bits; and update the state of the M single-bit buffer locations, when the populated M single-bit buffer locations are in a corresponding predefined state, to a state that indicates which bit (if any) in the remaining sub-sequence of N–M bits is the first bit in the sub-sequence of N–M bits to have a read value that is different from a first predefined value. The M single-bit buffer locations are typically populated in a predefined order, corresponding to the order in which the initial sub-sequence of M bits are read. In some implementations, each N-bit binary sequence is generated by a sequence of N read operations from a single memory location. In some implementations, the number of single-bit buffer locations, M, is equal to $\lceil \log_2 (N+1) \rceil$, where $\lceil x \rceil$ represents the value of "x" rounded up to the closest integer.

Even more generally, read data compression module 321 includes a device operable to compress a sequence of data values. In some implementations the device includes a plurality of buffer locations and a compression module. In some implementations, there are fewer buffer locations than the total number of data values in the sequence. In some implementations, the compression module is configured to: populate each of the plurality of buffer locations by setting each buffer location to a corresponding value from an initial sub-sequence of sequence of data values; and update the collective state of the plurality buffer locations for each data value of a remaining sub-sequence of the sequence of data values in sequential order by determining whether the plurality of buffer locations is in a first state and overwriting the first state of the plurality of buffer locations when a respective remaining data value has a first value.

In some implementations, the compression module 321a is further configured to sequentially evaluate each bit of the remaining sub-sequence of N–M bits by: determining whether the M single-bit buffer locations are in the predefined state; determining whether the bit under evaluation has a read value equal to the first predefined value; and maintaining the predefined state of the M single-bit buffer locations in response to a positive determination that the M single-bit buffer locations are in the predefined state and the bit under evaluation has a read value equal to the first predefined value.

Figure 5A:
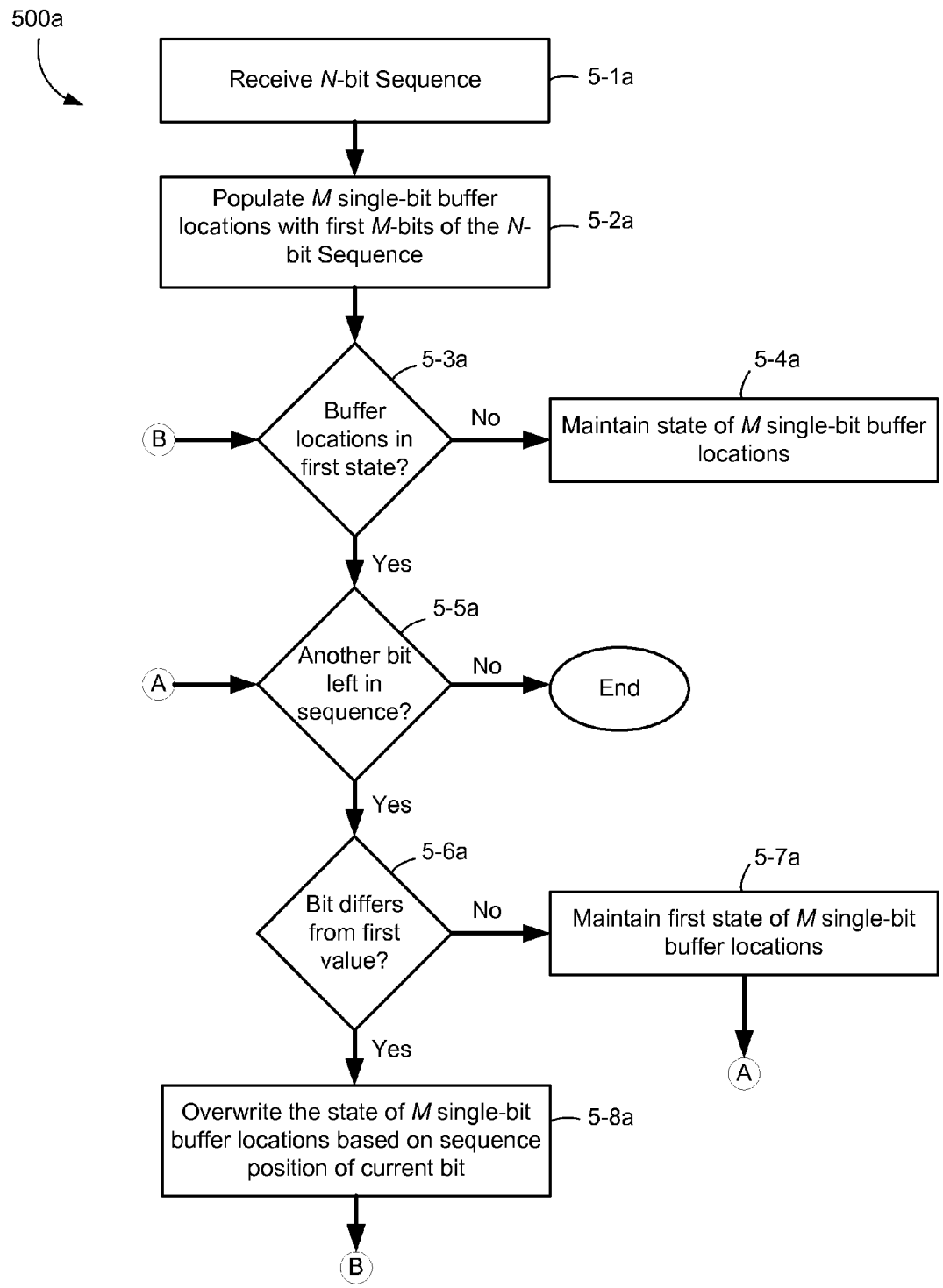
FIG. 5A is a flowchart representation of a method of compressing data read from a storage medium, in accordance with some embodiments.

FIG. 5A is a flowchart representation of a method 500a of compressing data read from a storage medium (e.g., storage medium 130) according to some implementations. In some implementations, method 500a is performed by a memory controller or a module associated with a memory controller (e.g., read data compression module 321 shown in FIGS. 3 and 4). Briefly, method 500a includes compressing a N-bit binary sequence, that was generated by a sequence of N read operations from a single memory location, using M single-bit buffer locations, where N is an integer greater than 2 (i.e., 3 or more), and M is less than N. In some implementations, $M = \lceil \log_2 (N+1) \rceil$. In some embodiments, the method 500a is performed for each bit of a codeword, and thus is typically performed thousands of times when a codeword having thousands of bits is read from the storage medium. More generally, in some embodiments, any of the data compression methods described herein is performed for each bit of a codeword, and thus is typically performed thousands of times when a codeword having thousands of bits is read from the storage medium.

To that end, as represented by block 5-1a, method 500a includes receiving a N-bit sequence, that was generated by a sequence of N read operations from a single memory location. For example, with continued reference to FIGS. 3 and 4, read data compression module 321 receives raw read data values from the storage medium I/O 128 via data line 415. In some implementations, each read operation in the sequence of N read operations produces a read value equal to a binary 1 or 0. In some implementations, each of the sequence of N read operations includes applying a different respective reading signal. In some implementations, each respective reading signal is a reading threshold voltage suitable for application to the gates of memory cells in a flash memory. In some implementations, the reading threshold voltages used for the sequence of N read operations include a monotonically increasing or decreasing sequence of reading threshold voltages.

As represented by block 5-2a, the method includes populating the M single-bit buffer locations with the first M-bits of the N-bit sequence. In some implementations, the M single-bit buffer locations are populated by setting each respective single-bit buffer location of the M single-bit buffer locations to a value corresponding to a read value obtained by a respective read operation of the M initial read operations. In some implementations, the M single-bit buffer locations are populated, in a predefined order, from a constituent least-significant-bit location to a constituent most-significant-bit location of the M single-bit buffer locations.

As represented by block 5-3a, method 500a includes determining whether the M single-bit buffer locations are in a first state (i.e., a corresponding predefined state). In some implementations, the first state corresponds to an all-zero state, such that the data value stored in each of the M single-bit buffer locations is a "0." If the M single-bit buffer locations are not in the first state ("No" path from block 5-3a), as represented by block 5-4a, method 500a includes maintaining the state of the M single-bit buffer locations irrespective of the remaining N−M bits in the N-bit sequence. On the other hand, if the M single-bit buffer locations are in the first state ("Yes" path from block 5-3a), as represented by block 5-5a, method 500a includes determining if there is at least another unchecked bit in the remaining N−M bits of the N-bit sequence, the first of which represents the current bit under evaluation. If there are no more unchecked bits ("No" path from block 5-5a), the N-bit sequence has been fully compressed and the method ends for the N-bit sequence. On the other hand, if there is another sequential unchecked bit in the N-bit sequence ("Yes" path from block 5-5a), as represented by block 5-6a, method 500a includes determining whether the sequential unchecked bit (i.e., the current bit under evaluation) is different from a first predefined value. In some implementations, the first predefined value is a "0." In some other implementations, the first predefined value is a "1." If the current bit under evaluation is equal to the first predefined value ("No" path from block 5-6a), as represented by block 5-7a, method 500a includes maintaining the first state of the M single-bit buffer locations. In other words, for each read operation in the N−M subsequent read operations that produces a read value equal to the first predefined read value, the method includes maintaining the first state of the M single-bit buffer locations. Method 500a then circles back to the portion of the method represented by block 5-5a, with the latest current bit under evaluation becoming a checked (or considered) bit. On the other hand, if the current bit under evaluation differs from the first predefined value ("Yes" path from block 5-6a), as represented by block 5-8a, method 500a includes overwriting the state of the M single-bit buffer locations based on the sequence position of the current sequential unchecked bit. In other words, as represented by block 5-8a, method 500a includes updating the state of the M single-bit buffer locations to a state that indicates which read operation in the sequence of N read operations is the first read operation in said sequence to produce a read value that is different from the first predefined read value. Method 500a then circles back to the portion of the method represented by block 5-3a, with the latest current bit under evaluation becoming a checked (or considered) bit.

More generally, with reference to portions of method 500a represented by blocks 5-3a to 5-8a, method 500a includes updating the state of the M single-bit buffer locations to a state that indicates which read operation in the sequence of N read operations is the first read operation in said sequence to produce a read value (e.g., "1") that is different from the first predefined read value (e.g., "0"). Even more generally, with reference to portions of method 500a represented by blocks 5-3a to 5-8a, method 500a includes updating the collective state of the plurality buffer locations for each data value in a remaining sub-sequence of the sequence of data values in sequential order by: determining whether the plurality of buffer locations is in a first state; and overwriting the first state of the plurality of buffer locations when a respective remaining data value has a first value. The method further includes maintaining (5-7a) the predefined state of the M single-bit buffer locations for each read operation in the N−M subsequent read operations that produces a read value equal to the first predefined read value.

In some implementations of method 500a, the sequence of operations shown in FIG. 5A is replaced by a single table lookup operation, which directly converts the N-bit binary sequence received at 5-1a into an M-bit compressed value, representing the state of the M single-bit buffer locations. For example, when the number of read operations is 3, an example of the lookup table is shown below in Table 1 (note that "x" means "don't care," because the same 2-bit compressed value is produced regardless of whether the "x" is equal to "1" or "0"):

TABLE 1

| First Read | Second Read | Third Read | 2-Bit Compressed value |
|---|---|---|---|
| 1 | x | x | 11 |
| 0 | 1 | x | 10 |
| 0 | 0 | 1 | 01 |
| 0 | 0 | 0 | 00 |

In some implementations of method 500a, the sequence of operations shown in FIG. 5A is performed by digital combinatorial logic that generates an M-bit compressed value directly from the received N-bit binary sequence received at 5-1a without performing any decision loops.

Figure 5B:
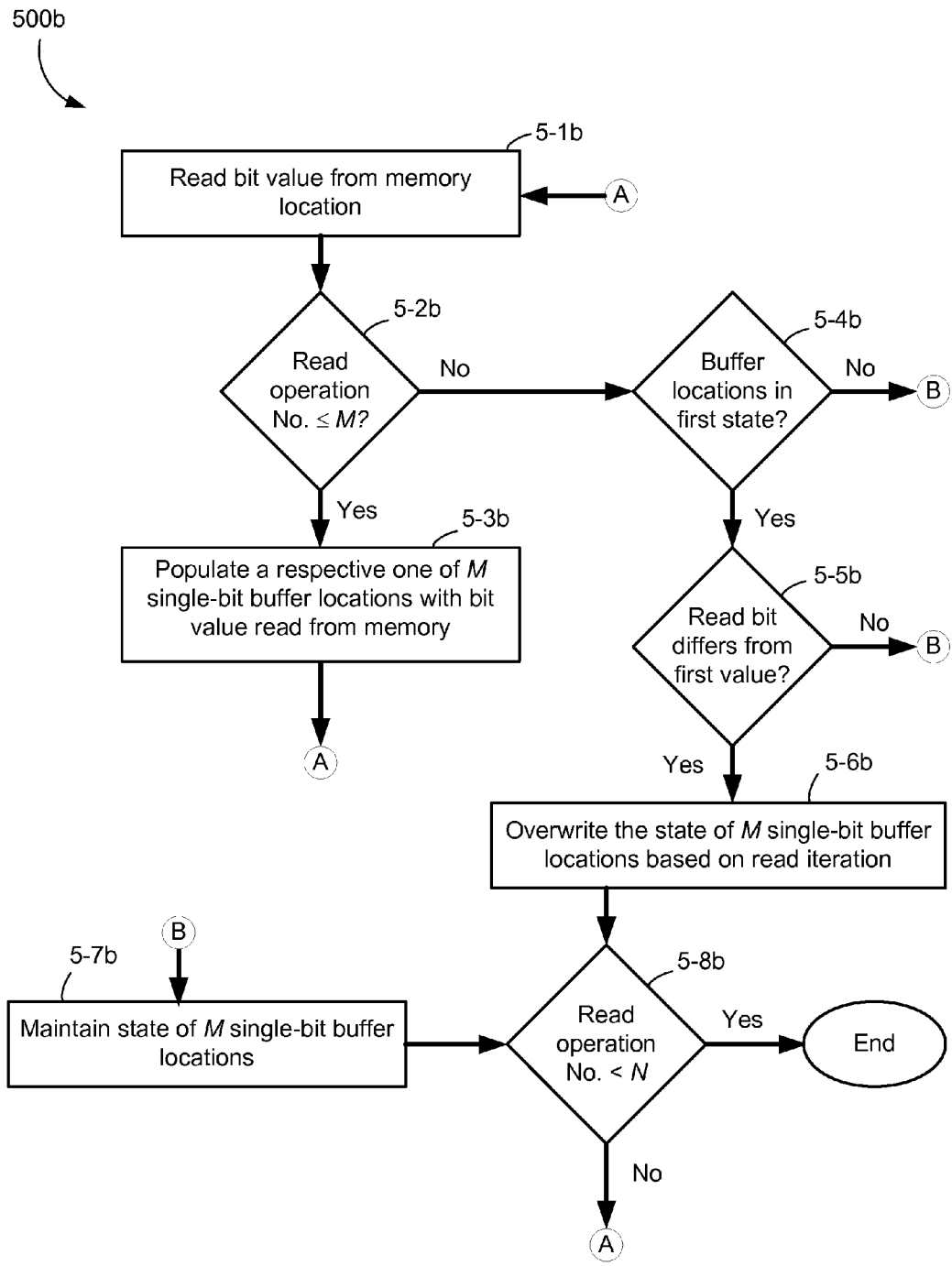
FIG. 5B is a flowchart representation of another method of compressing data read from a storage medium, in accordance with some embodiments.

FIG. 5B is a flowchart representation of a method 500b of compressing data read from a storage medium according to some implementations. In some implementations, method 500b is performed by a memory controller or a module associated with a memory controller (e.g., read data compression module 321 shown in FIGS. 3 and 4). In other implementations method 500b is performed by logic (e.g., compression module 1012, FIG. 10) in storage medium 130 (identified as memory system 1010 in FIG. 10) as raw data is generated by a sequence of read operations from a single memory location. Briefly, method 500b includes compressing a N-bit binary sequence as it is generated by a sequence of N read operations from a single memory location, using M single-bit buffer locations, wherein M is less than N. In some implementations, M=⌈ $\log_2$ (N+1)⌉. In some embodiments, the method 500b is performed for each bit of a codeword, and thus is typically performed thousands of times when a codeword having thousands of bits is read from the storage medium.

To that end, as represented by block 5-1b, method 500b includes performing a read operation to read a bit value from a memory location. Those skilled in the art will appreciate from the present disclosure that performing a read operation on a memory device, such as a flash memory, typically includes reading data values from a number of memory locations together (e.g., all or a portion of the memory locations included in a block, a wordline a page, or a sector of a page). However, for the sake of clarity, method 500b is described with respect to reading data values from a single memory location. Those skilled in the art will appreciate from the present disclosure that in some implementations method 500b is modified to operate on two or more N-bit binary sequences in parallel and/or serially, where the two or more N-bit binary sequences are generated by a sequence of N read operations from two or more memory locations.

As represented by block 5-2b, method 500b includes determining whether the number of read operations performed so far is less than or equal to M, the number of single-bit buffer locations. If the number of read operations performed is less than or equal to M ("Yes" path from block 5-2b), as represented by block 5-3b, method 500b includes populating a respective one of the M single-bit buffer locations with the bit value read from the memory location. Method 500b then circles back to the portion of the method represented by block 5-1b. In some implementations, with reference to block 5-1b to 5-3b, method 500b includes populating the M single-bit buffer locations in order from a constituent least-significant-bit location to a constituent most-significant-bit location of the M single-bit buffer locations. In some implementations, populating the M single-bit buffer locations occurs on a per read basis, as shown in FIG. 5B. On the other hand, if the number of read operations performed is greater than M ("No" path from block 5-2b), as represented by block 5-4b, method 500b includes determining whether the M single-bit buffer locations are in a first state. If the M single-bit buffer locations are not in the first state ("No" path from block 5-4b), as represented by block 5-7b, method 500b includes maintaining the state of the M single-bit buffer locations irrespective of any remaining bit values subsequently read from the memory location. On the other hand, if the M single-bit buffer locations are in the first state ("Yes" path from block 5-4b), as represented by block 5-5b, method 500b includes determining whether the read bit value differs from a first value. In some implementations, the first predefined value is a "0." In some other implementations, the first predefined value is a "1."

If the read bit value is equal to the first predefined value ("No" path from block 5-5b), as represented by block 5-7b, method 500b includes maintaining the first state of the M single-bit buffer locations. In other words, for each read operation greater than M that produces a read value equal to the first predefined read value, the method includes maintaining the first state of the M single-bit buffer locations. Following the portion of the method represented by block 5-7b, method 500b proceeds to the portion of the method represented by block 5-8b, which is discussed in greater detail below.

With continued reference to block 5-5b, on the other hand, if the read bit value differs from the first predefined value ("Yes" path from block 5-5b), as represented by block 5-6b, method 500b includes overwriting the state of the M single-bit buffer locations based on how many read operations have been performed thus far. In other words, as represented by block 5-6b, method 500b includes updating the state of the M single-bit buffer locations to a state that indicates which read operation in the sequence of N read operations is the first read operation in said sequence to produce a read value that is different from the first predefined read value. Subsequently, as represented by block 5-8b, method 500b includes determining whether N read operations have been performed. If N read operations have been performed ("Yes" path from block 5-8b), an N-bit sequence has been read from the memory location and compressed. Accordingly, method 500b ends for the memory location. On the other hand, if fewer than N read operations have been performed ("No" path from block 5-8b), method 500b circles back to the portion of the method represented by block 5-1b.

More generally, with reference to portions of method 500b represented by blocks 5-4b to 5-8b, method 500b includes updating the state of the M single-bit buffer locations to a state that indicates which read operation in the sequence of N read operations is the first read operation in said sequence to produce a read value that is different from the first predefined read value. From another viewpoint, with reference to portions of method 500b represented by blocks 5-3b to 5-8b, method 500b includes updating the collective state of the plurality buffer locations for each data value in a remaining sub-sequence of the sequence of data values in sequential order by: determining whether the plurality of buffer locations is in a first state; and overwriting the first state of the plurality of buffer locations when a respective remaining data value has a first value. The method further includes maintaining the predefined state of the M single-bit buffer locations for each read operation in the N–M subsequent read operations that produces a read value equal to the first predefined read value.

Optionally, in some implementations, a modified version of method 500b includes, upon determining at block 5-4b that the M single-bit buffer locations are not in the first state ("No" path from block 5-4b), aborting the sequence of read operations, because method 500b includes maintaining the state of the M single-bit buffer locations irrespective of any remaining bit values subsequently read from the memory location. In the resulting modified method 500b, the "No" branch from block 5-4b would go directly to method "End" instead of block 5-7b. As a result, fewer read operations are performed to obtain the same compressed representation of the raw data read from the memory location, which reduces latency and reduces power consumption. This improvement is potentially most practical in implementation in which method 500b is performed by logic in storage medium 130.

Figure 6:
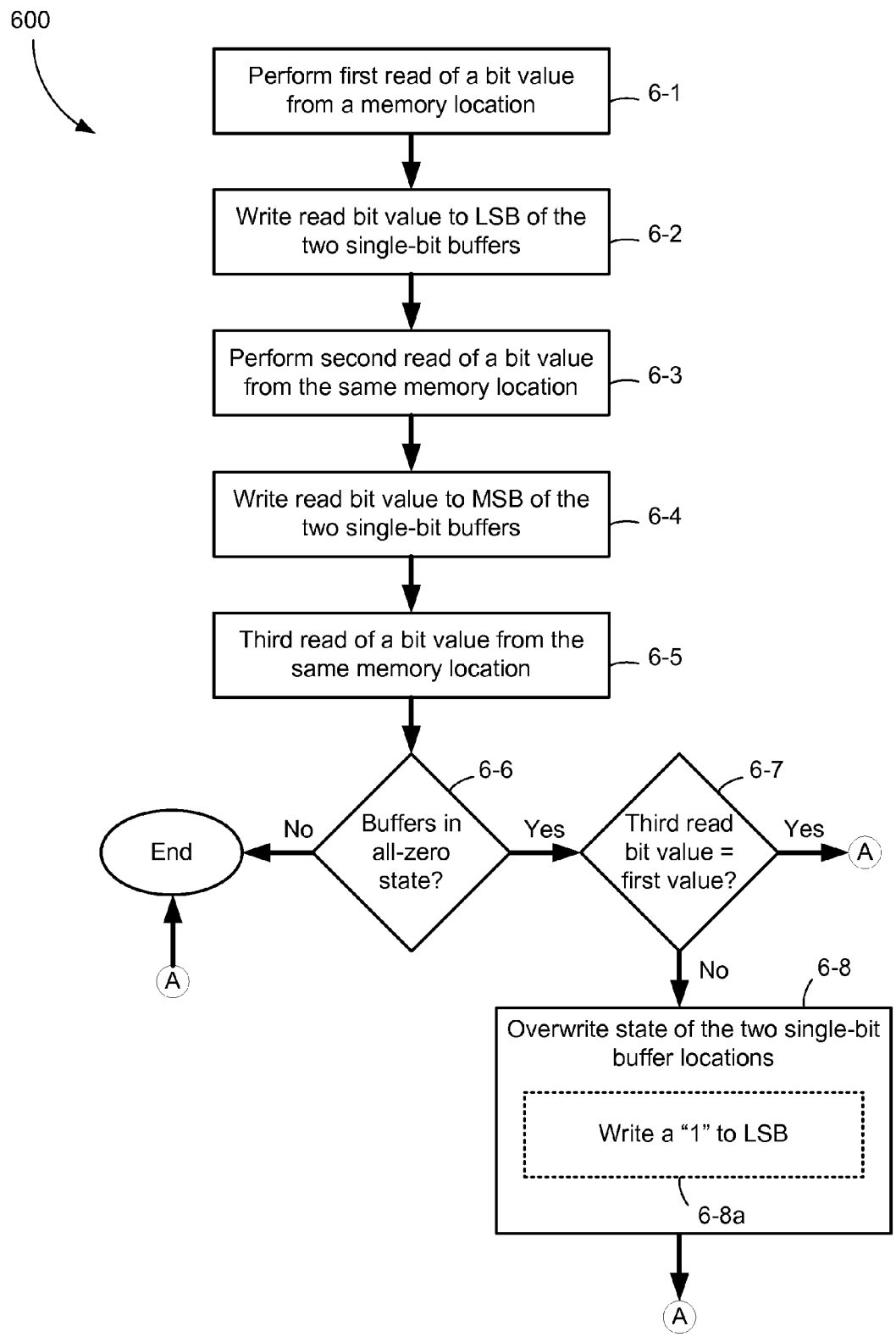
FIG. 6 is a flowchart representation of a method of compressing a 3-bit sequence of raw read data into a 2-bit representation, in accordance with some embodiments.

FIG. 6 is a flowchart representation of a method 600 of compressing a 3-bit sequence of raw read data into a 2-bit representation. In some implementations, method 600 is performed by a memory controller or a module associated with a memory controller (e.g., read data compression module 321 shown in FIGS. 3 and 4). In other implementations, method 600 is performed by circuitry (e.g., logic circuitry) in a persistent storage device. Briefly, method 600 includes compressing a 3-bit binary sequence of raw read data, which is generated by a corresponding sequence of three read operations from a single memory location, using two single-bit buffer locations.

As represented by block 6-1, method 600 includes performing a first read operation to obtain a bit value from a memory location. As represented by block 6-2, method 600 includes writing the first read bit value to the least significant bit (LSB) of the two single-bit buffer locations. Often the LSB is the right-most bit location in a buffer or a register. However, those skilled in the art will appreciate from the present disclosure that the opposite (i.e., designating the left-most bit location in a buffer or a register as the LSB) and various other arrangements are possible without departing from the scope of the claims. As represented by block 6-3, method 600 includes performing a second read operation to obtain a bit value from the same memory location as the first read operation. As represented by block 6-4, method 600 includes writing the second read bit value to the most significant bit (MSB) of the two single-bit buffer locations. As represented by block 6-5, method 600 includes performing a third read operation to obtain a bit value from the same memory location as the first and second read operations. As represented by block 6-6, method 600 includes determining whether the two single-bit buffer locations are in an all-zero state (i.e., whether the bit value in each of the two single-bit buffer locations is a "0"). If the two single-bit buffer locations are not in the all-zero state ("No" path from block 6-6), method 600 ends for the 3-bit sequence by maintaining the non-zero state of the two single-bit buffer locations that was produced after the first two read operations. On the other hand, if the two single-bit buffer locations are in the all-zero state ("Yes" path from block 6-6), as represented by block 6-7, method 600 includes determining whether the bit value produced by the third read operation is equal to a first predefined value. In some implementations, the first predefined value is a "0." In some other implementations, the first predefined value is a "1." If the third read bit value is equal to the first predefined value ("Yes" path from block 6-7), method 600 ends for the 3-bit sequence by maintaining the non-zero state of the two single-bit buffer locations that was produced after the first two read operations. On the other hand, if the third read bit value differs from the first predefined value ("No" path from block 6-7), as represented by block 6-8, method 600 includes overwriting the state of the two single-bit buffer locations. More specifically, in some implementations, as represented by sub-block 6-8a, overwriting the state of the two single-bit buffer locations includes writing a "1" to the LSB of the two single-bit buffer locations. In some implementations, overwriting the state of the two single-bit buffer locations includes writing a "1" to the MSB of the two single-bit buffer locations (not shown in FIG. 6).

Figure 7:
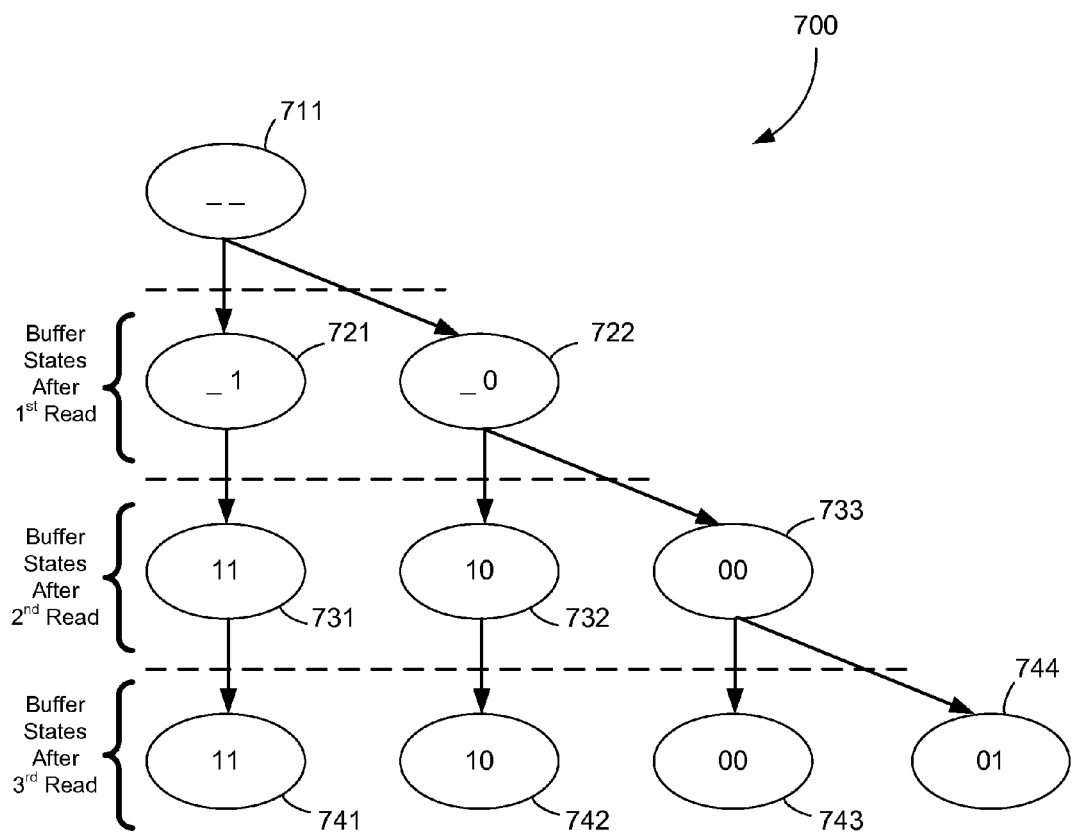
FIG. 7 is a state diagram including the possible states of two single-bit buffer locations based on the method represented in FIG. 6, in accordance with some embodiments.

FIG. 7 is a state diagram 700 illustrating the possible states of two single-bit buffer locations based on method 600 represented by illustration in FIG. 6. The first state 711 corresponds to the state of the two single-bit buffer locations before a reading threshold voltage is applied for a first read operation, and thus the two single-bit buffer locations do not yet include valid data. In response to a first read operation, as represented by block 6-2 of FIG. 6 discussed above, the two single-bit buffer locations will enter one of two states 721, 722 depending on the first read bit value that is written to the LSB. If the first read operation yields a "1," the two single-bit buffer locations will enter state 721 (e.g., "_1") from state 711. On the hand, if the first read operation yields a "0," the two single-bit buffer locations will enter state 722 (e.g., "_0) from state 711.

In response to a second read operation, as represented by block 6-4 of FIG. 6 discussed above, the two single-bit buffer locations will enter one of three states 731, 732, 733 depending on the second read bit value and the current state of the two single-bit buffer locations. If the second read operation yields a "1" and the two single-bit buffer locations are in state 722, the two single-bit buffer locations will enter state 732 (e.g., "01") from state 722. If the second read operation yields a "0" and the two single-bit buffer locations are in state 722, the two single-bit buffer locations will enter state 733 (e.g., "00") from state 722. If the two single-bit buffer locations are in state 721, the two single-bit buffer locations will enter state 731 (e.g., "11") regardless of the second read bit value. After the second read operation, the two single-bit buffer locations both include valid data because the two single-bit buffer locations are populated with values that are a combination of the read data bit values that were read during the first and second read operations.

In response to a third read operation, as represented by block 6-5 of FIG. 6 discussed above, the two single-bit buffer locations will enter one of four states 741, 742, 743, 744 depending on the third read bit value and the current state of the two single-bit buffer locations. If the two single-bit buffer locations are in state 731, the two single-bit buffer locations will enter state 741 regardless of the third read bit value. Similarly, if the two single-bit buffer locations are in state 732, the two single-bit buffer locations will enter state 742 regardless of the third read bit value. If the two single-bit buffer locations are in state 733 and the third read bit value is a "1," two single-bit buffer locations will enter state 744 (e.g., "01") from state 733. If the two single-bit buffer locations are in state 733 and the third read bit value is a "0," two single-bit buffer locations will enter state 743 (e.g., "00") from state 733. As such, method 600, prevents newly generated non-zero states from conflicting with previously generated non-zero states while reducing the number of buffer locations need to store a 3-bit sequence of raw read data.

Figure 8:
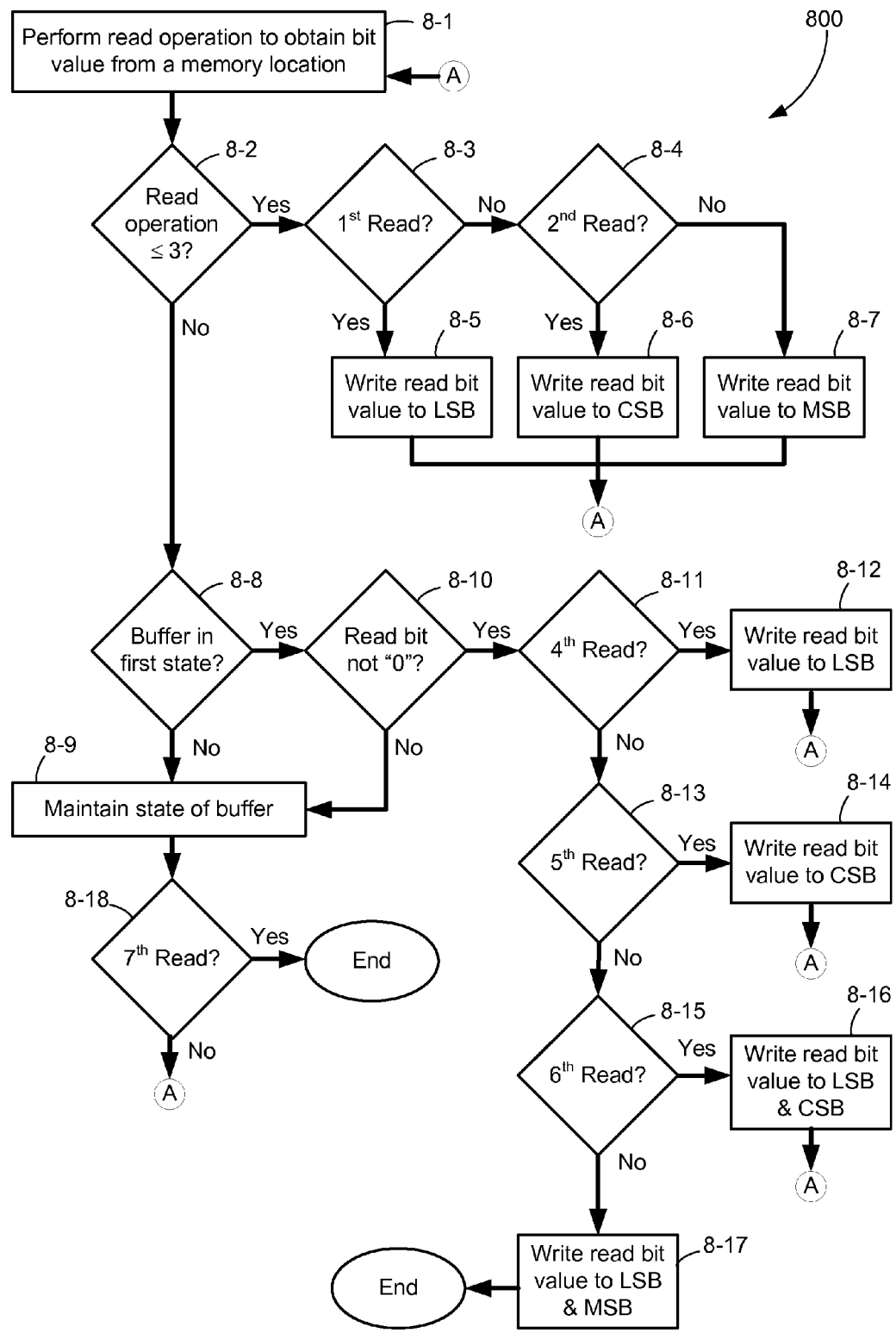
FIG. 8 is a flowchart representation of a method of compressing a 7-bit sequence of raw read data into a 3-bit representation, in accordance with some embodiments.

FIG. 8 is a flowchart representation of a method 800 of compressing a 7-bit sequence of raw read data into 3-bit representation. In some implementations, method 800 is performed by a memory controller or a module associated with a memory controller (e.g., read data compression module 321 shown in FIGS. 3 and 4). Briefly, method 800 includes compressing a 7-bit binary sequence of raw read data, which is generated by a corresponding sequence of seven read operations from a single memory location, using three single-bit buffer locations.

As represented by block 8-1, method 800 includes performing a read operation to read a bit value from a memory location. As noted above, those skilled in the art will appreciate from the present disclosure that performing a read operation on a memory device, such as a flash memory, typically includes reading data values from a number of memory locations together (e.g., all or a portion of the memory locations included in a block, a zone, a word-line and/or a page). However, for the sake of clarity, method 800 is described with respect to reading data values from a single memory location. Nevertheless, those skilled in the art will appreciate from the present disclosure that in some implementations method 800 is modified to operate on two or more 7-bit binary sequences in parallel and/or serially, where the two or more 7-bit binary sequences are generated by a sequence of seven read operations from a corresponding two or more memory locations.

As represented by block 8-2, method 800 includes determining whether the number of read operations performed so far is less than or equal to three. If the number of read operations performed thus far is greater than three ("No" path from block 8-2), method 800 proceeds to the portion of the method represented by block 8-8, which is described in greater detail further below. On the other hand, the number of read operations performed so far is less than or equal to three ("Yes" path from block 8-2), as represented by block 8-3, method 800 includes determining whether or not the latest read operation performed is the first read operation on the memory location. If the latest read operation is the first read operation on the memory location ("Yes" path from block 8-3), as represented by block 8-5, method 800 includes writing the raw read data value (i.e., the read bit) to the LSB of the three single-bit buffer locations. On the other hand, if the latest read operation is not the first read operation on the memory location ("No" path from block 8-3), as represented by block 8-4, method 800 includes, determining whether or not the latest read operation performed is the second read operation on the memory location. If the latest read operation is the second read operation on the memory location ("Yes" path from block 8-4), as represented by block 8-6, method 800 includes writing the raw read data value (i.e., the read bit) to the center significant bit (CSB) of the three single-bit buffer locations. On the other hand, if the latest read operation is not the second read operation on the memory location ("No" path from block 8-4), as represented by block 8-7, method 800 includes writing the raw read data value (i.e., the read bit) to the most significant bit (MSB) of the three single-bit buffer locations.

Alternatively, in some implementations, the operation represented by block 8-6 is determined in accordance with the value of the LSB; in particular, if the LSB has been set to a predefined value (e.g., "1"), then the CSB is set to the same predefined value regardless of the value of the second read bit; otherwise, the CSB is set to the value of the second read bit. Similarly, in some implementations, the operation represented by block 8-7 is determined in accordance with the value of the LSB; in particular, if the CSB has been set to a predefined value (e.g., "1"), then the MSB is set to the same predefined value regardless of the value of the second read bit; otherwise, the MSB is set to the value of the third read bit.

Following the respective portions of the method represented by block 8-5, 8-6 and 8-7, method 800 includes looping back to the portion of the method represented by block 8-1.

With reference to block 8-8, method 800 includes determining whether or not the three single-bit buffer locations are in a first state (e.g., "000"). In some implementations, the first state is an all-zero state in which each of the three single-bit buffer locations stores a "0." However, those skilled in the art will appreciate that the first state may also include any combination of values stored in the three single-bit buffer locations. If the three single-bit buffer locations are not in the first state ("No" path from block 8-8), as represented by block 8-9, method 800 includes maintaining the state of the three single-bit buffer locations, without regard to the value of the bit read during the latest read operation. Subsequently, as represented by block 8-18, method 800 includes determining whether or not the latest read operation performed is the seventh read operation on the memory location. If the latest read operation is the seventh read operation on the memory location ("Yes" path from block 8-18), method 800 ends for the 7-bit sequence by maintaining the state of the three single-bit buffer locations. On the other hand, if the latest read operation is not the seventh read operation on the memory location ("No" path from block 8-18), method 800 loops back to the portion of the method represented by block 8-1.

With further reference to block 8-8, if the three single-bit buffer locations are in the first state ("Yes" path from block 8-8), as represented by block 8-10, method 800 includes determining whether or not the latest read bit value is different from a first predefined read value. In some implementations, as shown in FIG. 8, the first predefined value is a "0." In some other implementations, the first predefined value is a "1." If the latest read bit value is not different from the first predefined read value ("No" path from block 8-10), method 800 proceeds to the portion of the method represented by 8-9 described above. On the other hand, if the latest read bit value is different from the first predefined read value ("Yes" path from block 8-10), as represented by block 8-11, method 800 includes determining whether or not the latest read operation performed is the fourth read operation on the memory location. If the latest read operation is the fourth read operation on the memory location ("Yes" path from block 8-11), as represented by block 8-12, method 800 includes writing the raw read data value (i.e., the read bit) to the LSB of the three single-bit buffer locations. On the other hand, if the latest read operation is not the fourth read operation on the memory location ("No" path from block 8-11), as represented by block 8-13, method 800 includes, determining whether or not the latest read operation performed is the fifth read operation on the memory location. If the latest read operation is the fifth read operation on the memory location ("Yes" path from block 8-13), as represented by block 8-14, method 800 includes writing the raw read data value (i.e., the read bit) to the CSB of the three single-bit buffer locations. On the other hand, if the latest read operation is not the fifth read operation on the memory location ("No" path from block 8-13), as represented by block 8-15, method 800 includes, determining whether or not the latest read operation performed is the sixth read operation on the memory location. If the latest read operation is the sixth read operation on the memory location ("Yes" path from block 8-15), as represented by block 8-16, method 800 includes writing the raw read data value (i.e., the read bit) to the LSB and to the CSB of the three single-bit buffer locations. On the other hand, if the latest read operation is not the sixth read operation on the memory location ("No" path from block 8-15), as represented by block 8-17, method 800 includes writing the raw read data value (i.e., the read bit) to the LSB and to the MSB of the three single-bit buffer locations.

Figure 9:
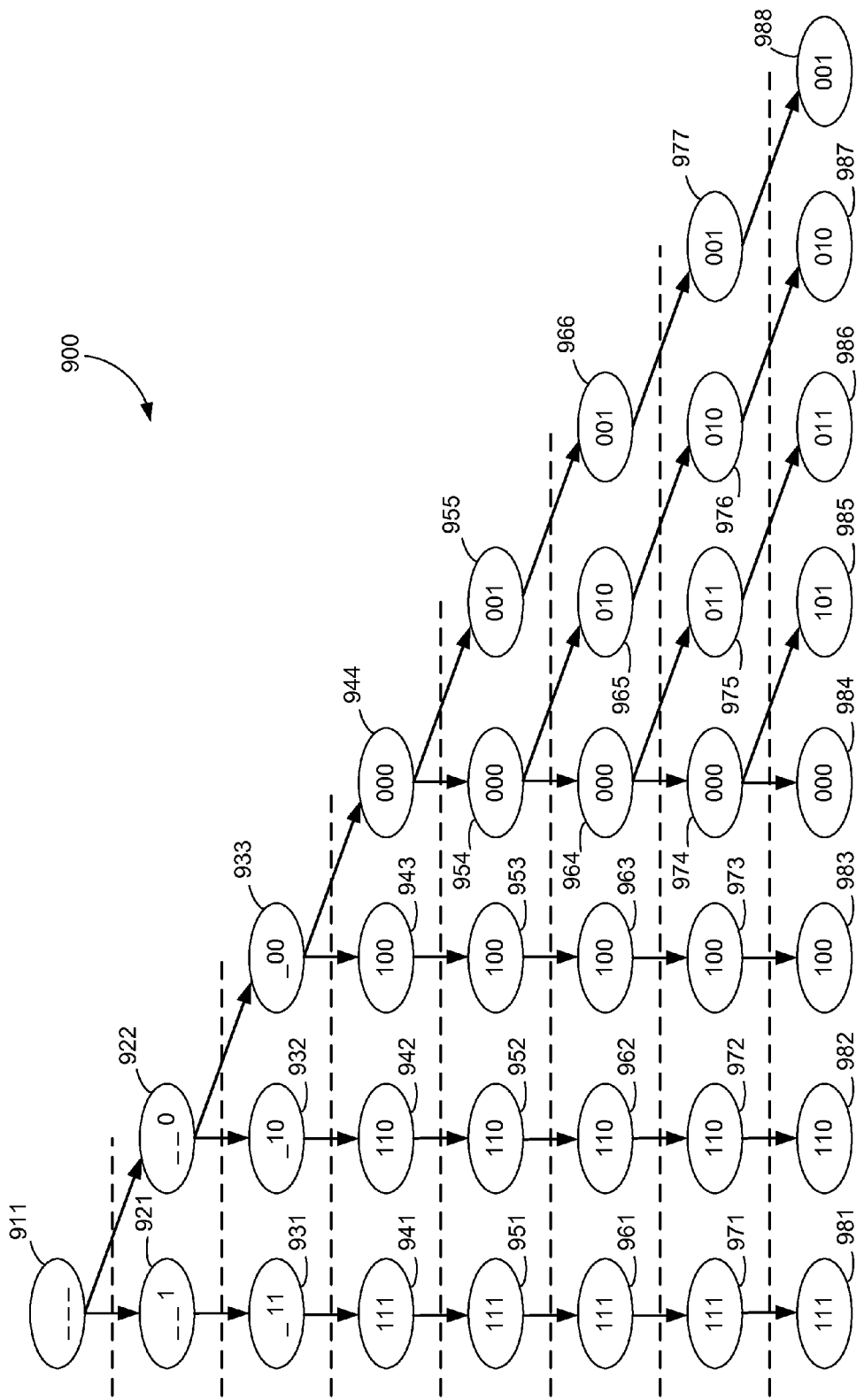
FIG. 9 is a state diagram including the possible states of three single-bit buffer locations based on the method represented in FIG. 8, in accordance with some embodiments.

FIG. 9 is a state diagram illustrating the possible states of three single-bit buffer locations based on method 800 represented by illustration in FIG. 8. The first state 911 corresponds to the state of the three single-bit buffer locations before a reading threshold voltage is applied for a first read operation, and thus the three single-bit buffer locations do not yet include valid data.

In response to a first read operation, described above with reference to FIG. 8, the three single-bit buffer locations will enter one of two states 921, 922 depending on the first read bit value, in which the LSB is populated with the first read bit value. In response to a second read operation, described above with reference to FIG. 8, the three single-bit buffer locations will enter one of three states 931, 932, 933 depending on the second read bit value, in which the CSB is populated based on a function of the second read bit value and the first read bit value. In response to a third read operation, described above with reference to FIG. 8, the three single-bit buffer locations will enter one of four states 941, 942, 943, 944 depending on the third read bit value, in which the MSB is populated based on a function of the third read bit value, the second read bit value and the first read bit value.

In some implementations, once the three single-bit buffer locations have been fully populated, method 800 operates to overwrite the all-zero state when a subsequent read value is different from first predefined value. As such, if after the third read the three single-bit buffer locations are in state 941 (e.g., "111"), the three single-bit buffer locations sequentially progress to states 951, 961, 971 and 981 in response to the subsequent read operations, without regard to the bit values obtained by those subsequent read operations. Similarly, if after the third read the three single-bit buffer locations are in state 942 (e.g., "110"), the three single-bit buffer locations sequentially progress to states 952, 962, 972 and 982 in response to the subsequent read operations, without regard to the bit values obtained by those subsequent read operations. Similarly, if after the third read the three single-bit buffer locations are in state 943 (e.g., "100"), the three single-bit buffer locations sequentially progress to states 953, 963, 973 and 983 in response to the subsequent read operations, without regard to the bit values obtained by those subsequent read operations.

However, if after the third read the three single-bit buffer locations are in state 944 (an all-zero state) after three read operations, in response to the fourth read the three single-bit buffer locations enter state 955 if a "1" is read, and enter state 954 if a "0" is read. If the three single-bit buffer locations enter state 955, the three single-bit buffer locations sequentially enter states 966, 977 and 988 in response to subsequent read operations, without regard to the bit values obtained by those subsequent read operations.

Similarly, if after the fourth read the three single-bit buffer locations are in state 954 (an all-zero state), in response to the fifth read the three single-bit buffer locations enter state 965 if a "1" is read, and enter state 964 if a "0" is read. If the three single-bit buffer locations enter state 965, the three single-bit buffer locations sequentially enter states 976 and 987 in response to subsequent read operations, without regard to the bit values obtained by those subsequent read operations.

Similarly, if after the fifth read the three single-bit buffer locations are in state 964 (an all-zero state), in response to the sixth read the three single-bit buffer locations enter state 975 if a "1" is read, and enter state 974 if a "0" is read. If the three single-bit buffer locations enter state 975, the three single-bit buffer locations enter state 986 after the seventh read, without regard to the bit value obtained by the seventh read. Similarly, if after the sixth read the three single-bit buffer locations are in state 974 (an all-zero state), in response to the seventh read the three single-bit buffer locations enter state 985 if a "1" is read, and enter state 984 if a "0" is read.

Figure 10:
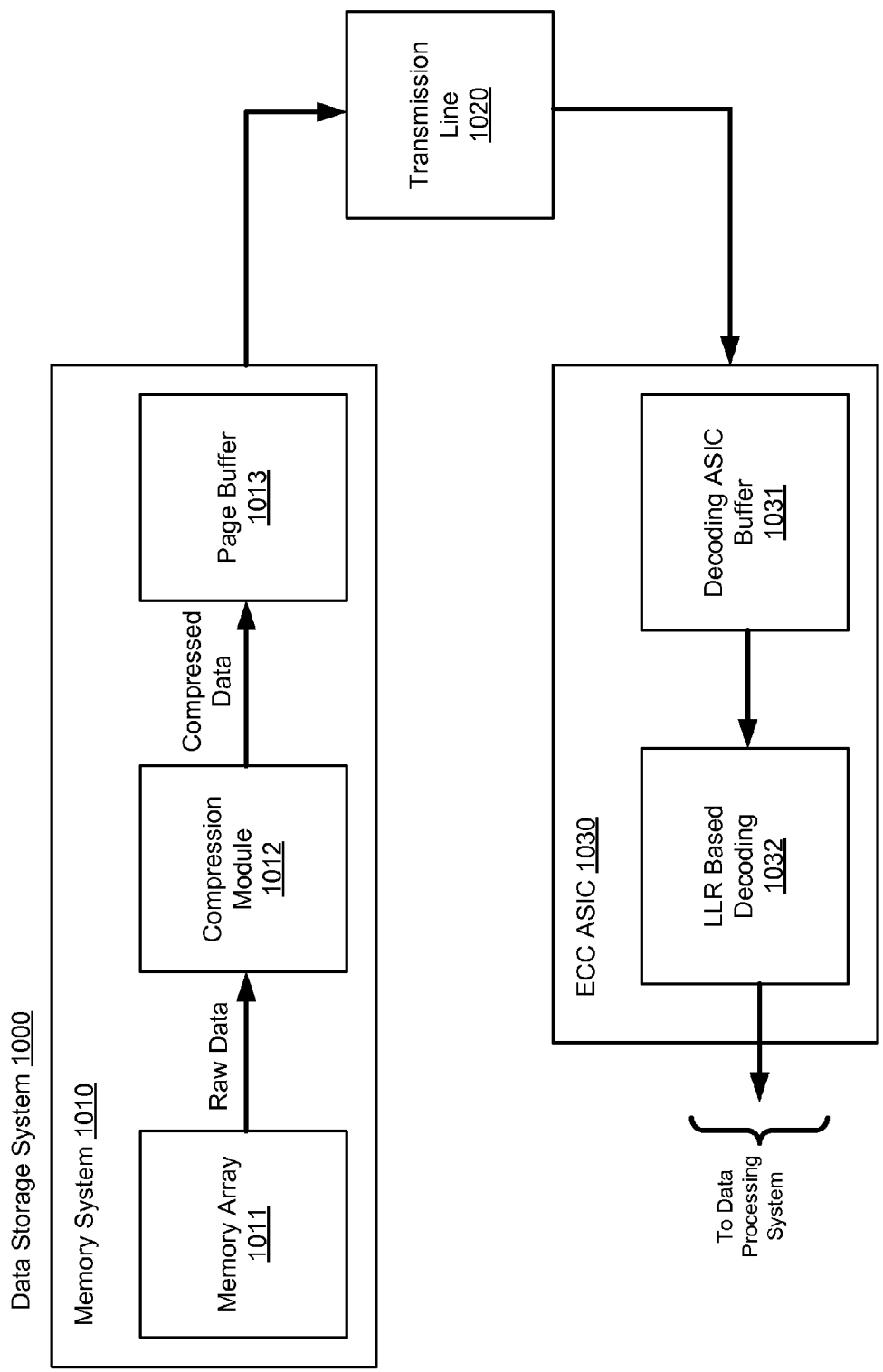
FIG. 10 is a diagram of a data storage system, in accordance with some embodiments.

FIG. 10 is a diagram of a data storage system 1000 according to some implementations. Data storage system 1000 illustrated in FIG. 10 is similar to and adapted from the data storage system 300 illustrated in FIG. 3. While certain specific features are illustrated, those skilled in the art will appreciate from the present disclosure that various other features have not been illustrated for the sake of brevity and so as not to obscure more pertinent aspects of the example implementations disclosed herein.

To that end, data storage system 1000 includes a memory system 1010 (e.g., storage medium 130 or a system that includes storage medium 130), an error control code (ECC) application specific integrated circuit (ASIC) 1030, and a transmission lines coupling the memory system 1010 and the ECC ASIC 1030. The memory system 1010 includes a memory array 1011 (e.g., one or more flash memory die), a compression module 1012 and a page buffer 1013 coupled in series. The ECC ASIC 1030 includes a decoding ASIC buffer 1031 and a LLR based decoding module 1032 coupled in series and operable to provide decoded data to a data processing system (not shown). In operation, compression module 1012 compresses sequences of raw data read from memory array 1011 (e.g., as described above with reference to FIGS. 3-9), and writes compressed data to page buffer 1013. Compressed data from page buffer 1013 is transmitted across transmission line 1020, where it is received by decoding ASIC buffer 1031. In turn, LLR based decoding module 1032 decodes the compressed data stored in decoding ASIC buffer 1031 (e.g., as described above with reference to FIGS. 1, 3 and 4).

Figure 11:
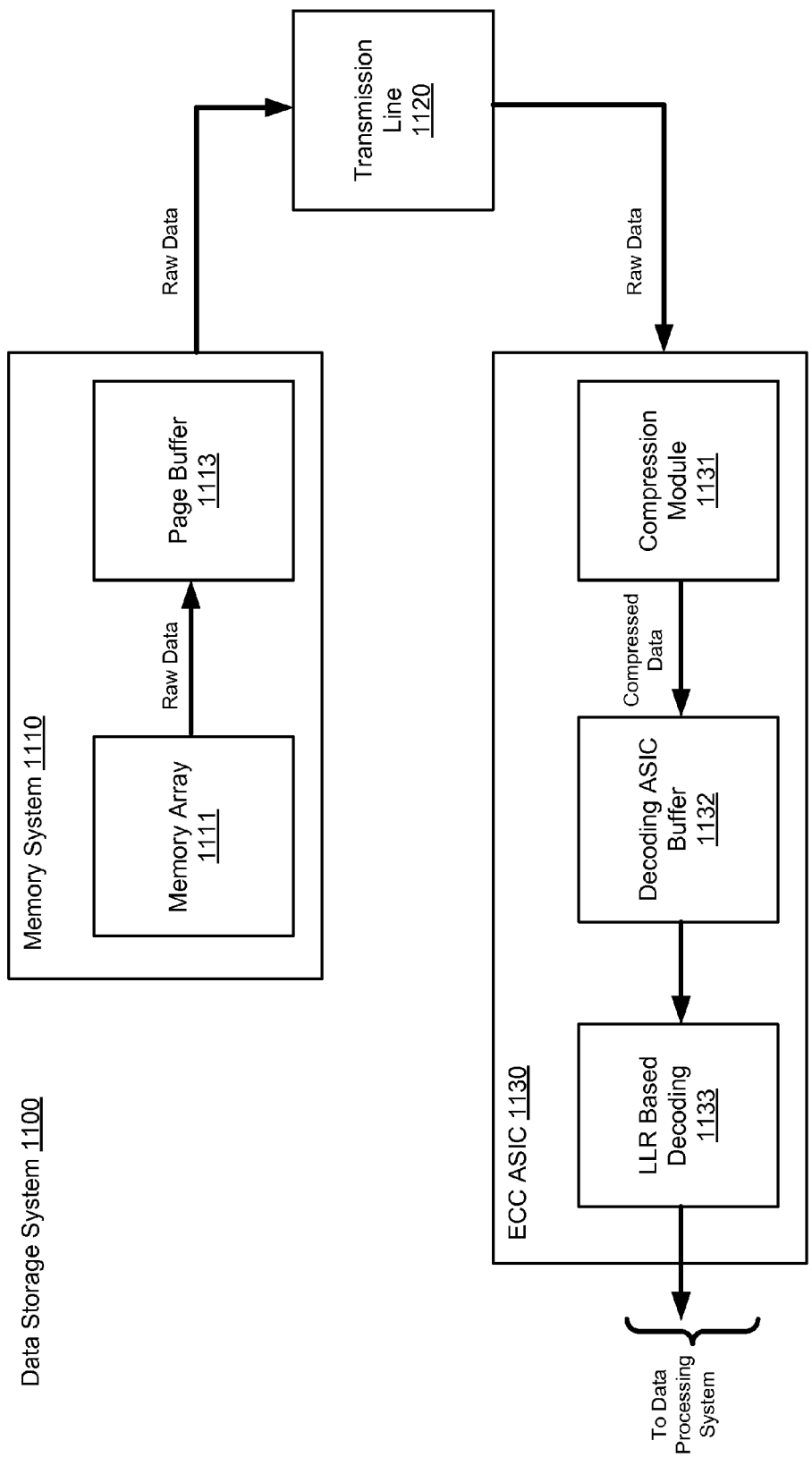
FIG. 11 is a diagram of another data storage system, in accordance with some embodiments.

FIG. 11 is a diagram of a data storage system 1100 according to some implementations. Data storage system 1100 illustrated in FIG. 11 is similar to and adapted from data storage system 1000 illustrated in FIG. 10. Moreover, while certain specific features are illustrated, those skilled in the art will appreciate from the present disclosure that various other features have not been illustrated for the sake of brevity and so as not to obscure more pertinent aspects of the example implementations disclosed herein.

To that end, the primary difference between data storage systems 1000 and 1100 is that compression module 1131 is implemented on ECC ASIC 1130. In operation, raw data that is read from memory array 1111 is stored in page buffer 1113 without first being compressed. The raw data from page buffer 1113 is transmitted across transmission line 1120, where it is received by compression module 1131. Compression module 1131 compresses sequences of raw data and stores compressed data in decoding ASIC buffer 1132. In turn, LLR based decoding module 1133 decodes the compressed data stored in decoding ASIC buffer 1132.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of representing a N-bit binary sequence from a sequence of N memory read operations, the method comprising:

in response to M initial read operations in a sequence of N read operations that read from a single memory location, populating the M single-bit buffer locations by setting each respective single-bit buffer location of the M single-bit buffer locations to a value corresponding to a read value obtained by a respective read operation of the M initial read operations; and in response to the N−M subsequent read operations, in accordance with a determination that the M single-bit buffer locations are in a corresponding predefined state after the M initial read operations, and at least one of the N−M subsequent read operations produces a read value that is different from a first predefined read value, updating the state of the M single-bit buffer locations to a state that indicates which read operation in the sequence of N read operations is the first read operation in said sequence to produce a read value that is different from the first predefined read value.

2. The method of claim 1, wherein $M = \lceil \log_2(N+1) \rceil$.

3. The method of claim 1, wherein for each read operation in the N–M subsequent read operations that produces a read value equal to the first predefined read value, the method further comprises:
maintaining the predefined state of the M single-bit buffer locations.

4. The method of claim 1, wherein each read operation in the sequence of N read operations produces a read value equal to a binary 1 or 0.

5. The method of claim 1, wherein each of the sequence of N read operations includes applying a respective reading signal.

6. The method of claim 5, wherein each respective reading signal is a reading threshold voltage suitable for a flash memory.

7. The method of claim 6, wherein the reading threshold voltages used for the sequence of N read operations comprise a monotonically increasing or decreasing sequence of reading threshold voltages.

8. The method of claim 1, wherein populating the M single-bit buffer locations occurs on a per read basis.

9. The method of claim 1, wherein populating the M single-bit buffer locations in order occurs from a constituent least-significant-bit location to a constituent most-significant-bit location of the M single-bit buffer locations.

10. The method of claim 1, further comprising obtaining a corresponding soft information value for decoding the single memory location based on the state of the M single-bit buffer locations.

11. A method of representing a sequence of data values using a plurality of buffer locations, wherein there are fewer buffer locations than the total number of data values in the sequence, the method comprising:
for an initial sub-sequence of the data values, populating the plurality of buffer locations by setting each of the plurality of buffer locations based on a respective sequential one of the initial sub-sequence of data values;
updating the collective state of the plurality of buffer locations for each remaining data value in a remaining sub-sequence of the sequence of data values in sequential order by:
determining whether the plurality of buffer locations is in a first state;
overwriting the first state of the plurality of buffer locations in accordance with a determination that the plurality of buffer locations is in the first state and the remaining data value has a predefined first value; and
forgoing updating the collective state of the plurality of buffer locations in accordance with a determination that the plurality of buffer locations is not in the first state or the remaining data value does not have the predefined first value.

12. The method of claim 11, wherein the sequence of data values includes a N-bit binary sequence.

13. The method of claim 12, further comprising generating the N-bit binary sequence by performing a sequence of N read operations of a single memory location storing a single-bit value, wherein each read operation produces a binary 1 or 0.

14. The method of claim 13, wherein each of the sequence of N read operations includes applying a respective reading signal.

15. The method of claim 14, wherein each respective reading signal is a threshold voltage suitable for a flash memory.

16. The method of claim 15, wherein the threshold voltages used for the sequence of N read operations comprise a monotonically increasing or decreasing sequence of threshold voltages.

17. The method of claim 11, wherein each of the plurality of buffer locations is configured to store a single-bit binary value.

18. The method of claim 17, wherein one of the plurality of buffer locations is populated for each data value in the initial sub-sequence of the data values.

19. The method of claim 11, wherein the plurality of buffer locations includes $M=\lceil \log_2 (N+1) \rceil$ single-bit buffer locations for each N-bit binary sequence generated.

20. The method of claim 11, wherein setting each respective buffer location comprises sequentially writing one of the sequence of data values to a respective one of the plurality of buffer locations.

21. The method of claim 11, wherein the first state corresponds to the all-zero state, and updating the state of the plurality buffer locations comprises:
incrementing the all-zero state, in accordance with a determination that a respective data value of the remaining sub-sequence is binary 0, by adding to the all-zero state a binary number based on a corresponding sequence position of the respective data value.

22. The method of claim 21, wherein the binary number is equal to the corresponding sequence position minus $\lceil \log_2 (N+1) \rceil$.

23. The method of claim 11, wherein populating the plurality of buffer locations in order occurs from a constituent least-significant-buffer location to a constituent most-significant-buffer location of the plurality of buffer locations.

24. A device operable to compress a N-bit binary sequence, the N-bit binary sequence having an initial sub-sequence of M bits and a remaining sub-sequence of N–M bits, the device comprising:
M single-bit buffer locations, wherein N is greater than M; and
a compression module configured to:
populate the M single-bit buffer locations by setting each respective single-bit buffer location to a corresponding value from the initial sub-sequence of M bits; and
update the state of the M single-bit buffer locations, in accordance with a determination that the populated M single-bit buffer locations are in a corresponding predefined state, to a state that indicates which bit in the remaining sub-sequence of N–M bits is the first bit in the sub-sequence of N–M bits to have a read value that is different from a first predefined value.

25. The device of claim 24, wherein the N-bit binary sequence is generated by a sequence of N read operations from a single memory location.

26. The device of claim 24, wherein the number of single-bit buffer locations, M, is equal to $\lceil \log_2 (N+1) \rceil$.

27. The device of claim 24, wherein the compression module is further configured to sequentially evaluate each bit of the remaining sub-sequence of N–M bits by:
determining whether the M single-bit buffer locations are in the predefined state;
determining whether the bit under evaluation has a read value equal to the first predefined value; and
maintaining the predefined state of the M single-bit buffer locations in response to a positive determination that the M single-bit buffer locations are in the predefined state and the bit under evaluation has a read value equal to the first predefined value.

28. A device operable to compress a sequence of data values, the device comprising:
- a plurality of buffer locations, wherein there are fewer buffer locations than the total number of data values in the sequence;
- a compression module configured to:
- populate each of the plurality of buffer locations by setting each buffer location to a corresponding value from an initial sub-sequence of sequence of data values; and update the collective state of the plurality buffer locations for each data value of a remaining sub-sequence of the sequence of data values in sequential order by determining whether the plurality of buffer locations is in a first state; overwriting the first state;
- overwriting the first state of the plurality of buffer locations in accordance with a determination that the plurality of buffer locations is in the first state and the remaining data value has a predefined first value;

and
- forgoing updating the collective state of the plurality of buffer locations in accordance with a determination that the plurality of buffer locations is not in the the first state or the remaining data value does not have the predefined first value.

* * * * *